US009465261B2

(12) United States Patent
Stahl et al.

(10) Patent No.: US 9,465,261 B2
(45) Date of Patent: Oct. 11, 2016

(54) DISPLAY DEVICE

(71) Applicants: PolyIC GmbH & Co. KG, Furth (DE); LEONHARD KURZ Stiftung & Co. KG, Furth (DE); OVD Kinegram AG, Zug (CH)

(72) Inventors: Rainer Stahl, Nuremberg (DE); Klaus Ludwig, Erlangen (DE); Johannes Schad, Furth (DE); Wayne Robert Tompkin, Baden (CH)

(73) Assignees: POLYIC GMBH & CO. KG, Furth (DE); LEONHARD KURZ STIFTUNG & CO. KG, Furth (DE); OVD KINEGRAM AG, Zug (CH)

( * ) Notice: Subject to any disclaimer, the term of this patent is extended or adjusted under 35 U.S.C. 154(b) by 153 days.

(21) Appl. No.: 14/354,836

(22) PCT Filed: Oct. 16, 2012

(86) PCT No.: PCT/EP2012/070479
§ 371 (c)(1),
(2) Date: Apr. 28, 2014

(87) PCT Pub. No.: WO2013/060599
PCT Pub. Date: May 2, 2013

(65) Prior Publication Data
US 2014/0307192 A1 Oct. 16, 2014

(30) Foreign Application Priority Data
Oct. 28, 2011 (DE) .......................... 10 2011 117 129

(51) Int. Cl.
G09G 3/34 (2006.01)
G02F 1/1343 (2006.01)
(Continued)

(52) U.S. Cl.
CPC ......... *G02F 1/134309* (2013.01); *B42D 25/29* (2014.10); *G02F 1/155* (2013.01);
(Continued)

(58) Field of Classification Search
CPC .................. G02F 1/155; G02F 1/167; G02F 2001/134354; G02F 2001/1557; G02F 2001/1676; G02F 1/134309; G09F 9/372; G09G 3/344; G09G 3/16; G09G 2300/0426; B42D 2033/26; B42D 2033/46; B42D 25/29
See application file for complete search history.

(56) References Cited

U.S. PATENT DOCUMENTS 5,257,122 A 10/1993 Dubal et al.
5,381,251 A * 1/1995 Nonomura ............ G02F 1/3132
349/172

(Continued)

FOREIGN PATENT DOCUMENTS

DE 2908764 9/1979
DE 3034454 4/1982
(Continued)

*Primary Examiner* — Charles Hicks
(74) *Attorney, Agent, or Firm* — Hoffmann & Baron, LLP

(57) ABSTRACT

The invention relates to a display device (10), in particular in the form of a multi-layer film body. The display device (10) has, in a first area (22), a first electrode (41), a second electrode (42), a third electrode (43) and a display layer (122) with a display material. The display layer (122) is arranged between the first electrode (41) and the second electrode (42). The third electrode (43) is arranged on the side of the display layer (122) facing away from the first electrode (41). The first electrode (41) is formed as an isolated electrode. The first electrode (41) overlaps both the second electrode (42) and the third electrode (43) at least in areas when viewed perpendicular to the plane spanned by the display layer (122).

38 Claims, 14 Drawing Sheets

(51) Int. Cl.
  *G02F 1/155* (2006.01)
  *G02F 1/167* (2006.01)
  *G09F 9/37* (2006.01)
  *B42D 25/29* (2014.01)
  *G09G 3/16* (2006.01)

(52) U.S. Cl.
  CPC .............. *G02F 1/167* (2013.01); *G09F 9/372* (2013.01); *G09G 3/344* (2013.01); *B42D 2033/26* (2013.01); *B42D 2033/46* (2013.01); *G02F 2001/134354* (2013.01); *G02F 2001/1557* (2013.01); *G02F 2001/1676* (2013.01); *G09G 3/16* (2013.01); *G09G 2300/0426* (2013.01)

(56) References Cited

U.S. PATENT DOCUMENTS

| | | |
|---|---|---|
| 6,118,426 A | 9/2000 | Albert et al. |
| 2001/0030639 A1 | 10/2001 | Goden |
| 2003/0179432 A1 | 9/2003 | Vincent et al. |
| 2004/0113902 A1 | 6/2004 | Yamaguchi et al. |
| 2004/0125433 A1 | 7/2004 | Matsuda et al. |
| 2004/0196230 A1 | 10/2004 | Nose et al. |
| 2004/0239613 A1 | 12/2004 | Kishi |
| 2008/0035736 A1 | 2/2008 | Tompkin et al. |
| 2008/0259416 A1 | 10/2008 | Peters et al. |
| 2009/0224245 A1 | 9/2009 | Umezaki |
| 2010/0045180 A1 | 2/2010 | Seelhammer et al. |
| 2010/0271408 A1 | 10/2010 | Lin et al. |
| 2010/0277441 A1 | 11/2010 | Stahl et al. |

FOREIGN PATENT DOCUMENTS

| | | |
|---|---|---|
| DE | 3917472 | 12/1990 |
| DE | 102004045211 | 3/2006 |
| DE | 102004059798 | 6/2006 |
| DE | 102007023860 | 11/2008 |
| DE | 102009038075 | 3/2010 |
| EP | 0987674 | 3/2000 |
| GB | 208373 | 12/1922 |
| GB | 2019048 | 10/1979 |
| GB | 2083938 | 3/1982 |
| JP | 2008089874 | 4/2008 |
| WO | NO03056382 | 7/2003 |
| WO | WO 2008/125926 | 10/2008 |

* cited by examiner

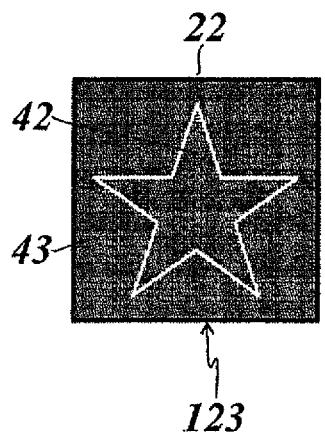 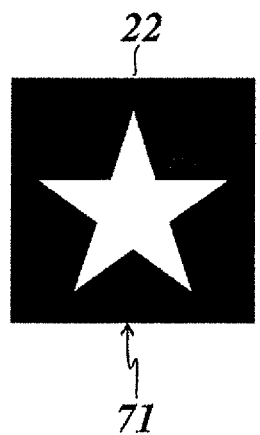 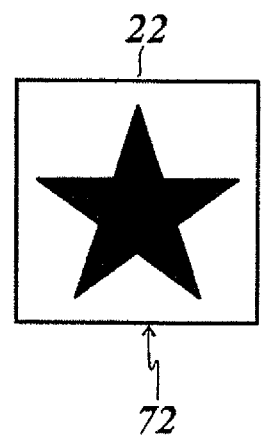
*Fig. 5a*     *Fig. 5b*     *Fig. 5c*
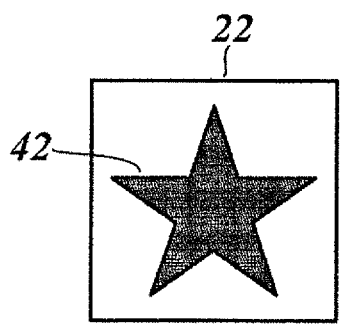 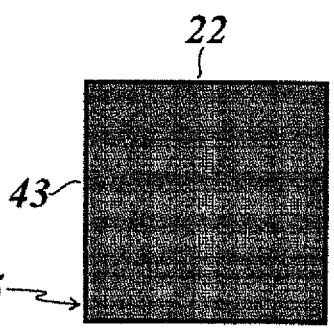
*Fig. 6a*     *Fig. 6b*
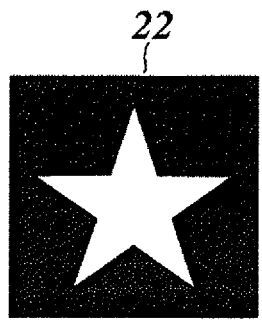 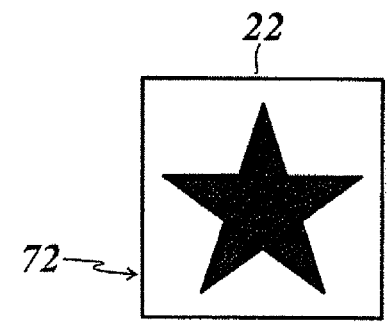
*Fig. 6c*     *Fig. 6d*

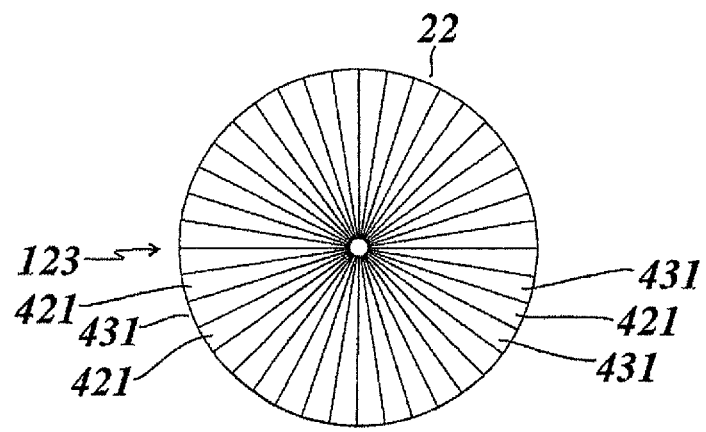
*Fig. 7a*
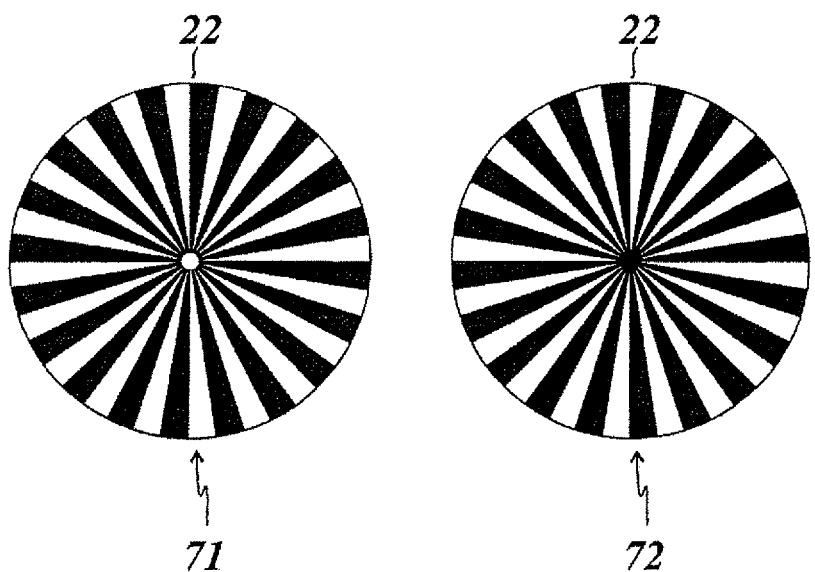
*Fig. 7b*  *Fig. 7c*

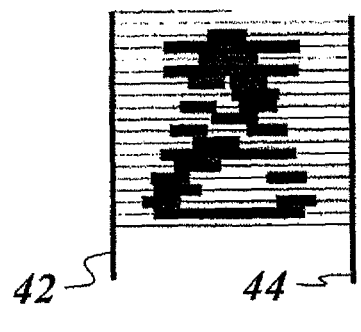 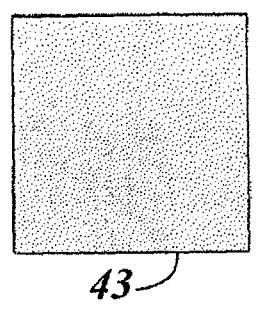 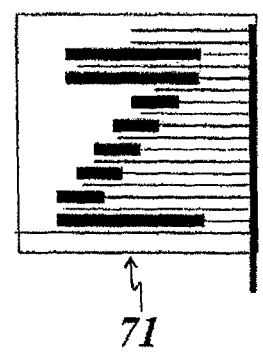
*Fig. 12e*  *Fig. 12f*  *Fig. 12g*
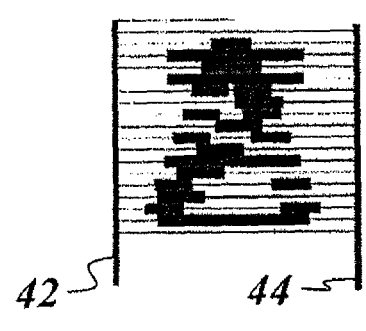 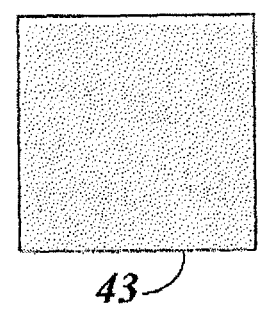 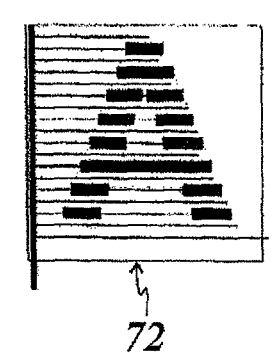
*Fig. 12h*  *Fig. 12i*  *Fig. 12j*

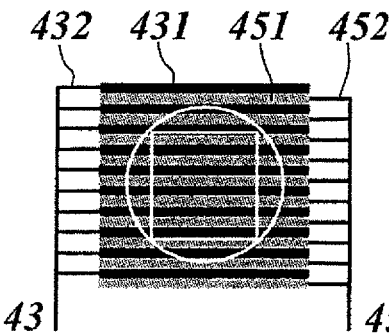 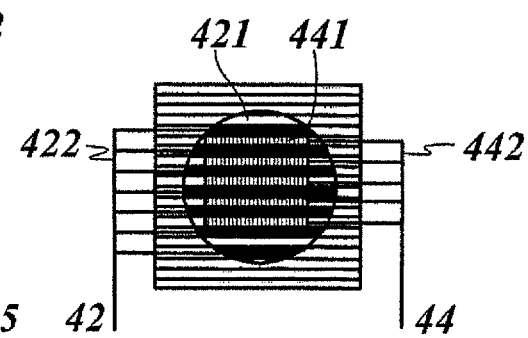
*Fig. 13a*      *Fig. 13b*
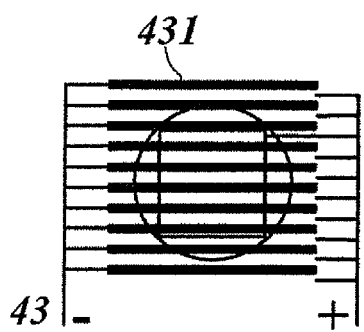 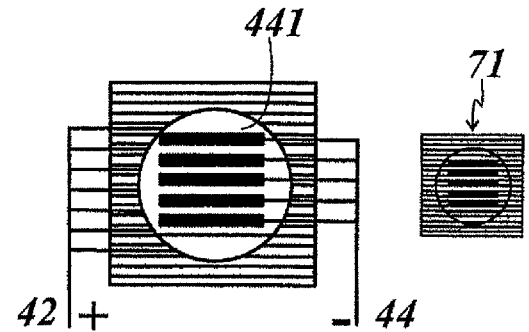 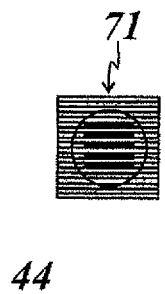
*Fig. 13c*      *Fig. 13d*      *Fig. 13e*
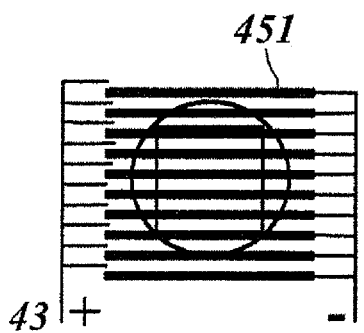 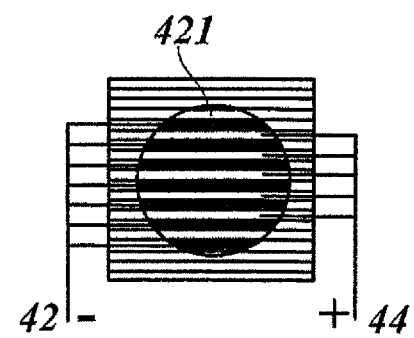 
*Fig. 13f*      *Fig. 13g*      *Fig. 13h*

DISPLAY DEVICE

This application claims priority based on an International Application filed under the Patent Cooperation Treaty, PCT/EP2012/070479, filed on Oct. 16, 2012, and German Application No. DE 102011117129.4, filed on Oct. 28, 2011.

BACKGROUND OF THE INVENTION

The invention relates to a display device which is formed in particular in the form of a multi-layer film body. The invention relates in particular to a display device as a security element on a security document such as e.g. a banknote, an ID document, a value document, ticket, coupon, lottery ticket or a price tag.

For the display of information, it is known to arrange a display material, in particular a liquid crystal material, between an upper electrode and a lower electrode. When a voltage is applied to the two electrodes, the liquid crystals arranged in the overlap area of the two electrodes are aligned corresponding to the electric field that forms, with the result that in this area the optical properties of the display device change, which can be utilized, in conjunction with polarizers arranged on top of or underneath the liquid crystal layer, to display an item of information.

SUMMARY OF THE INVENTION

The object of the invention is now to provide an improved display device.

This object is achieved by a display device, in particular in the form of a multi-layer film body, which has, in a first area, a first electrode, a second electrode, a third electrode and a display layer with a display material, wherein the display layer is arranged between the first electrode and the second electrode, and the third electrode is arranged on the side of the display layer facing away from the first electrode, wherein the first electrode is formed as an isolated electrode and, when viewed perpendicular to the plane spanned by the display layer, the first electrode overlaps both the second electrode and the third electrode at least in areas.

Instead of the previously described operating principle, in which a voltage is applied between two electrodes arranged on opposite sides of the display layer, firstly three electrodes are thus provided here. An isolated electrode is provided on one side of the display layer and two electrodes, which can be connected to a power source to display an item of information, are provided on the other side of the display layer. The electrodes which are to be connected to the power source are thus not provided on opposite sides, but on the same side of the display layer. It has surprisingly been shown that with such an arrangement and formation of the electrodes, when a voltage is applied between the two electrodes arranged on the same side, a charge separation additionally results between the areas of the isolated electrode which overlap with the second electrode or the third electrode. This charge separation within the isolated electrode results, in the areas of the overlap with the second electrode or the third electrode, in an electric field which is oriented perpendicular to the plane spanned by the display layer. This makes it possible to provide electrodes of the display device that are intended for connection to the power source only on one side of the display device, and further to achieve two optionally differently shaped areas, in which the display material of the display layer is exposed to a differently oriented field, by applying a voltage between two electrodes. This can—as also explained in detail below—be utilized to generate interesting and complex optical effects with small outlay on circuit technology. The invention thus achieves the advantage of making a cost-effective mass production of display devices possible and of displaying complex information by means of a display device with small outlay on circuit technology.

An isolated electrode is formed in particular by an electrode made of an electrically conductive material which is not galvanically connected to an external electric potential, for example a current source or voltage source, and is thus "floating". The first electrode is thus in particular neither galvanically connected to a current source or a voltage source nor galvanically connected to connection elements which serve for connection to a current or voltage source or an electrical control circuit.

The first electrode is preferably encapsulated by means of one or more dielectric layers and preferably surrounded on all sides by dielectric layers which prevent a charge inflow or a charge outflow from the first electrode, or at least substantially impede this. The resistance, provided by the dielectric layers, between the first electrode and an electrically conductive layer bordering the dielectric layers is preferably more than 10 megohms, further preferably more than 100 megohms, if capacitive displays such as e.g. electrophoretic displays are used. If current-driven displays such as e.g. electrochromic displays are used, the resistance, provided by the dielectric layers, between the first electrode and an electrically conductive layer bordering the dielectric layers is preferably more than 10 kilo-ohms, further preferably more than 50 kilo-ohms.

The side of the first electrode facing away from the display layer and the edges of the first electrode are preferably covered by a dielectric material, for example covered by a dielectric varnish layer or a dielectric plastic film. At least the side of the display layer facing the first electrode is preferably formed from a dielectric material, or a dielectric layer which insulates the underside of the first electrode from electrically conductive layers of the display device is arranged between the display layer and the first electrode.

By dielectric layer or a dielectric material is meant a layer or material the sheet resistance of which is greater than 10 megohms, further preferably greater than 100 megohms.

According to a preferred embodiment example of the invention, the display device has a current or voltage source and/or an electrical control circuit, wherein the second and third electrodes, but not the first electrode, are galvanically connected to the power source or control circuit via a connection element. The power source is preferably formed by a piezo element, a solar cell, a battery and/or an antenna. A piezo element here preferably consists of a layer of a piezo material which is provided with electrodes on both sides and which, when bent, generates a voltage pulse dependent on the bending direction. If an antenna is used as power source, the antenna is preferably connected to a rectifier and optionally a storage capacitor which stores the HF energy absorbed by the antenna. The inductive coupling of energy into the antenna preferably takes place by means of an external power source such as e.g. an RF reader, RF transceiver or mobile telephone. If a solar cell, a battery and/or an antenna are used as power source, it can also be advantageous to switch the polarity of the power source by means of a switch integrated into the display device.

According to a preferred embodiment example of the invention, the display material is formed such that, when a voltage is applied between the second and third electrodes, it shows different optical properties, in particular shows different colors, in the overlap area of the first and second electrodes and in the overlap area of the first and third electrodes. When a voltage is applied to the second and third electrodes, the two areas thus show a different optical appearance, for example one area appears white, the other area appears black. If the applied voltage is inverted, the contrary effect is brought about, i.e. for example one area appears black and the other area appears white. Two different items of optical information, for which two electrode pairs and a corresponding control circuit would be necessary in the above-described known operating principle, can thus be generated in a simple manner through the shaping of the second and third electrodes by providing only one electrode pair.

The display material preferably has a plurality of electrically charged particles which are dispersed in a liquid, wherein the liquid and the particles differ in terms of their optical properties, in particular differ in terms of their color. When an electric field is applied, either the electrically charged particles or the liquid are thus visible on the top side of the display material, with the result that, depending on the polarity of the electric field, the display material shows the optical properties of the particles or of the liquid.

According to a further preferred embodiment variant, the display material has a plurality of first particles and a plurality of second particles, wherein the first particles differ from the second particles in relation to their electric charge and in relation to their optical properties. In particular, the first particles are thus positively charged and the second particles are negatively charged. The first and second particles are further preferably dispersed in a liquid, the optical properties of which can likewise further differ from the optical properties of the first particles and second particles. The first and second particles preferably show different optical properties when viewed in reflection, and in particular differ in terms of their color, the reflectance or their scattering behavior.

In both of the above-described embodiment variants, the charged particles and the liquid can be encapsulated both in spherical microparticles or in chamber-like structures.

However, it is also further possible that the display material is formed by an electrochromic material, a liquid powder display material, a PDLC material (Polymer Dispersed Liquid Crystal), a liquid crystal material, in particular a cholesteric liquid crystal material, or an interference layer material (interferometric modulation display material).

The first, second and/or third electrodes are preferably formed transparent. By transparent electrode is meant here in particular an electrode which appears transparent for the human observer from a usual observation distance. The electrodes can thus consist for example of a transparent conductive material, for example indium tin oxide (ITO) or another transparent conductive oxide (e.g. aluminum zinc oxide, AZO), or of a conductive organic material such as e.g. PEDOT, graphene or carbon nanotubes, or consist of an intrinsically opaque, electrically conductive material which is substructured accordingly, for example is formed in the form of a one-dimensional or multi-dimensional grid, the grid lines of which lie below the resolution capacity of the human eye and in particular have a width of less than 100 µm, preferably less than 20 µm.

The second and third electrodes are preferably formed from a metallic conductive material. In particular, aluminum, gold, copper, silver, chromium come into consideration as metals.

According to a further preferred embodiment variant, the first electrode consists of a metallic conductive material and the second and third electrodes are in each case formed from a transparent conductive material.

Preferably, when viewed perpendicular to the plane spanned by the display layer, the first electrode overlaps the second and third electrodes over the whole surface, with the result that the "active" area of the display layer is determined by the shaping of the second and third electrodes. However, it is also possible that the "active" areas of the display layer are additionally also influenced by the structuring of the first layer, in order thus to deactivate for example partial areas of the second and third electrodes with respect to their optical action and thus for example to optically deactivate areas of the electrodes not allocated to image motifs.

Furthermore, it is also possible that the display material either is provided over the whole surface in the entire first area or is likewise provided structured only in selected areas of the first area, in order thus to achieve for example the above-described effects.

According to a preferred embodiment variant, the second and third electrodes are arranged in one plane and in particular are formed by galvanically separated areas of a common electrically conductive layer. This procedure has the advantage that only one single electrically conductive layer need be applied and structured to form the second and third electrodes, resulting in a particularly cost-effective production.

According to a further preferred embodiment example of the invention, the second and third electrodes differ in terms of their spacing relative to the plane spanned by the first electrode. The second and third electrodes are formed in particular by two different electrically conductive layers which are spaced apart from each other in relation to the normal relative to the plane spanned by the first electrode. Here, a dielectric layer is preferably arranged between the second and the third electrode. It is true that the outlay on production is increased by this embodiment. But then, it has been shown that all kinds of advantages can be achieved by such an arrangement. Thus, for example, it is possible to increase the contrast strength of the display device. Thus it is possible to realize hereby a directly successive arrangement of first overlap areas, in which the first electrode overlaps with the second electrode, and second overlap areas, in which the first electrode overlaps with the third electrode, which is not possible in the previous variant because of the necessary "isolation trench" between the second and the third electrode. It is thus possible to arrange directly next to each other two areas which show different optical properties when a voltage is applied to a second and third electrode and to avoid intermediate areas having an unclear "display state". In the case of an "isolation trench" between the second and the third electrode, the display material is exposed to no or an undefined electric field in this area, which can result in an unclear "display state".

In this embodiment, it is possible firstly that the third electrode and the second electrode completely overlap in relation to the plane spanned by the display layer. Advantages in terms of costs can hereby be achieved, as a register-accurate structuring of the second electrode relative to the third electrode is not necessary.

Furthermore, it is advantageous if the second electrode is arranged between the first electrode and the third electrode and the second electrode and the third electrode overlap only in areas, in particular overlap by less than 50% and further preferably by less than 25%. By this procedure, the display result can be improved, as the capacitances that form between the second and third electrodes and the resultant attenuation of the field profile between the second and first and third and first electrodes are reduced. The second and third electrodes preferably overlap here only in the boundary area between second and third electrode, in order thus to achieve the above-described advantage in respect of an increased contrast strength on the one hand and the above-described advantages in respect of a reduction in the capacitive load on the other.

The distance between the third electrode and the second electrode is preferably between 1% and 25% of the distance between the second electrode and the first electrode.

The distance between the first and second electrodes, the distance between the first and third electrodes and the distance between the second and third electrodes are preferably chosen such that c23 is smaller than $1/(1/c12+1/c13)$, wherein c12 is the capacitance between the first and second electrodes, c13 is the capacitance between the first and third electrodes and c23 is the capacitance between the second and third electrodes.

Furthermore, it is also possible that, in this embodiment as well, the second and third electrodes do not overlap in relation to the plane spanned by the display layer.

The first, second and third electrodes are preferably arranged parallel to each other.

According to a further preferred embodiment, the third electrode is not formed as a flat surface, but has a height profile with elevations and depressions. For this, a corresponding surface relief is for example imprinted into a replication lacquer layer and then an electrically conductive layer forming the third electrode is applied or a corresponding surface relief is molded into a multi-layer body comprising an electrically conductive layer and a replication lacquer layer. The difference in height between elevations and depressions (profile depth) here is preferably 1 µm to 25 µm, further preferably between 5 µm and 10 µm.

The depressions of the third electrode are preferably arranged in the area of the second electrode. The advantage is hereby achieved that, in this area, the distance between the second and third electrodes is increased and thus the capacitive load generated by the overlapping of the second and third electrodes is reduced. The relief is thus preferably molded register-accurate relative to the second electrode or the structuring of the electrically conductive layer forming the second electrode. The surface relief here is preferably chosen such that the distance between the first electrode and the third electrode is greater in the area of the second electrode than in the areas in which the third electrode, but not the second electrode, is provided. Thus, preferably, in the third electrode depressions are provided in the area of the second electrode and elevations are provided in the area of the first area not occupied by the second electrode. In order to reduce the necessary profile depth, it can be advantageous to fill the areas of the depressions with a material of lower dielectricity than that of the areas of the elevations.

Preferably, d1 here is approximately d2 and d3 is much greater than d2, wherein d1 is the distance between the first electrode and the second electrode, d2 is the distance between the first electrode and the elevations of the third electrode and d3 is the distance between the first electrode and the depressions of the third electrode. Thus d1 and d2 preferably differ by not more than 20% and the difference between d3 and d1 is preferably 3 times, further preferably 5 times, greater than the difference between d2 and d1.

In particular, the optical effects described below can be realized by the above-described embodiments:

According to a preferred embodiment, the second electrode is shaped in the form of a motif arranged in the first area and the third electrode is provided at least in a background area of the motif when viewed perpendicular to the plane spanned by the display layer. When there is a change in polarity of the voltage applied to the second and third electrodes, in particular an inverted representation of the motif thus results. A motif can be formed here for example by one or more numbers and letters, symbols, graphic representations, etc. The third electrode can be provided here over the whole surface in the entire first area or can be provided as a background in the area of the first area not occupied by the second electrode or can be provided in the form of a background, having a further motif, for the motif shaped in the second electrode.

Furthermore, it is also possible that the second electrode is shaped in the form of a further motif.

The motif here is preferably constructed from several partial motifs. The second and/or third electrodes here have several partial electrodes, connected by strip conductors, which are in each case shaped in the form of a partial motif or a background for one of the partial motifs. The strip conductor connecting the partial electrodes preferably has a width of less than 300 µm, preferably less than 100 µm. It can also be provided to use the strip conductors to connect the partial electrodes, not to each other, but to several independent power sources. A redundancy is thereby created which guarantees that the whole display device does not become inoperable if a strip conductor fails.

According to a preferred embodiment example, the second and third electrodes are shaped and arranged such that when there is a change in polarity of the voltage applied to the second and third electrodes a movement effect is generated and in particular the illusion of a movement of an object is shown as optical effect. Thus, for example, it is possible to provide two motifs rested in each other, in particular similar motifs, wherein the first motif is formed by overlap areas of the first electrode and the second electrode and the second motif is formed by overlap areas of the first electrode and the third electrode. For this, the second electrode—as already stated above—is preferably provided from several partial electrodes galvanically connected to each other, which form the first motif. The third electrode is either formed behind this area over the whole surface in the form of the motif or likewise formed from several partial electrodes galvanically connected to each other, which are provided at least partially between the partial electrodes of the second electrode. Furthermore, for this, it is possible that the second and/or third electrodes have in each case partial electrodes which are shaped in each case in the form of a segment of an object, in particular a rotationally symmetrical object, wherein partial electrodes or areas of the second and third electrodes are arranged alternating. A rotational movement of the object can hereby be generated as optical movement effect. Instead of the structuring of the third electrode in the form of partial electrodes, it is likewise possible here that the third electrode is provided over the whole surface in the entire area of the object and thus the segments between the partial electrodes of the second electrode are likewise covered with the third electrode.

According to a further preferred embodiment example of the invention, the second and/or third electrodes are shaped and arranged such that when there is a change in polarity of the voltage applied to the second or third electrode the effect of an inverting grayscale image is generated.

The second electrode preferably has several partial electrodes, connected by strip conductors, which are arranged according to a one- or two-dimensional grid with a grid width of less than 300 µm, preferably less than 200 µm and further preferably less than 100 µm. In particular, the partial electrodes have in each case a punctiform or linear shape. Furthermore, the width of the partial electrodes or the grid spacings are preferably varied to generate a grayscale image. The third electrode here is preferably formed over the whole surface in the area of the grayscale image or formed in the form of an inverted pattern relative to the second electrode. For the human observer, the optical effects generated by the first overlap areas (overlap area between first electrode and second electrode) and second overlap areas (overlap area between first electrode and third electrode) thus mix, with the result that the observer perceives a gray tone generated by the surface coverage density of the second partial electrode in the respective image spot.

By gray tone is also meant here a mixed color between the colors produced in the different states of the display material. Thus, for example, if a white color is generated by the display material when a voltage is applied between the second and the third electrode in the first overlap area and a black color is generated in the second overlap area, a grayscale image in the conventional sense results. If, when a voltage is applied between the second and third electrodes, a first primary color, for example red, is generated in the first overlap area and a second primary color, for example blue, is generated in the second overlap area, then by the grayscales of the generated grayscale image are meant the mixed colors resulting from the mixture of these two colors depending on the proportion of the two colors, which mixed colors lie on the straight line connecting these two primary colors in the spectrum locus of the chromaticity diagram. By a grayscale image is also meant therefore an image constructed from such mixed colors.

The grid is preferably a geometrically transformed grid. The partial electrodes thus have for example the shape of a wavy line. Furthermore, the grid is preferably formed as a one-dimensional grid, in particular as a line grid. In particular, this results in advantages in respect of the galvanic contacting of the partial electrodes.

The partial electrodes are preferably connected to each other by means of a plurality of connection tracks, which are preferably arranged according to a further regular or irregular grid.

According to a further preferred embodiment example of the invention, the display device has a fourth electrode, wherein the second and fourth electrodes are arranged between the first and the third electrode and the first and fourth electrodes overlap at least in areas when viewed perpendicular to a plane spanned by the display layer. Thus, the second and fourth electrodes are formed for example by partial areas, galvanically separated from each other, of a common electrically conductive layer and the third electrode is formed by areas of an electrically conductive layer which is arranged on the side of the common electrically conductive layer of the second and fourth electrodes facing away from the display layer.

The fourth electrode is preferably arranged inside the first area. The second electrode preferably forms a first item of information and the fourth electrode forms a second item of information. The second electrode is thus shaped for example in the form of a first motif, also composed of several partial motifs, which represents the first item of information. The fourth electrode is shaped in the form of a second motif which can likewise be composed of different partial motifs. The third electrode is preferably arranged in the background area for the first and second motifs and is thus arranged for example over the whole surface in the first area or structured correspondingly such that the third electrode is provided in the first area at least in the area not covered by the second and fourth electrodes. Thus, if the second electrode is occupied by a first voltage potential and the fourth and third electrodes are occupied by a second voltage potential, the first item of information is shown. If the fourth electrode is occupied by the first voltage potential and the second and third electrodes are occupied by the second voltage potential, the second motif is shown as the second item of information. With the inverted arrangement of the first and second voltage potentials, the first and second motifs are shown in inverted representation as the first and second items of information respectively.

A fifth electrode is preferably provided outside the first area, wherein the first and fifth electrodes overlap at least in areas when viewed perpendicular to a plane spanned by the display layer. The quality of the display of the first and second items of information can be improved through the arrangement of this further electrode by bringing about an equalized charge balance inside the display device.

According to a preferred embodiment example of the invention, the second electrode has a plurality of first partial electrodes, galvanically connected to each other, which are shaped and arranged such that they form the first item of information. Furthermore, the fourth electrode has a plurality of second partial electrodes, galvanically connected to each other, which are shaped and arranged such that they form the second item of information. The first and second partial electrodes have in each case a width of less than 300 µm, preferably less than 150 µm. The first and second partial electrodes are further arranged gridded in each other, in particular are arranged alternating. It hereby becomes possible to represent the first and second items of information in one area depending on the voltage potential applied to the second, third and fourth electrodes.

The first and second partial electrodes preferably have in each case a linear shape and are arranged according to a one-dimensional grid with a grid width of from 750 µm to 100 µm, further preferably from 300 µm to 50 µm.

This embodiment variant can furthermore also be combined with the above-described embodiment variant, in which a grayscale image is generated in the first area by skillful formation of the electrodes. Thus, for example, it is possible to form the first and second items of information in the form of a grayscale image and/or to generate them in front of a background, the color value of which corresponds to the color value of a grayscale. For this, the following electrode arrangement has proved its worth in particular: Inside the first area, a fifth electrode is provided which is arranged on the side of the display layer facing away from the first electrode. The third electrode has a plurality of third partial electrodes galvanically connected to each other. The fifth electrode has a plurality of fourth partial electrodes galvanically connected to each other. The third and fourth partial electrodes have in each case a width of less than 300 µm, further preferably less than 150 µm. The third and fourth partial electrodes are arranged gridded in each other, in particular are arranged alternating.

It is also possible here that the first, second, third or fourth partial electrodes have a linear shape and in particular consist of a geometrically transformed line, for example a serpentine line. The first, second, third and/or fourth partial electrodes are further preferably arranged parallel to each other.

According to a preferred embodiment example, the display device has a rectifier, wherein one of the two outputs of the rectifier is connected to the third electrode and the other of the outputs is connected to the fifth electrode. The display device furthermore has a power source, wherein one of the outputs of the power source is connected to one of the inputs of the rectifier and to the second electrode, and the other of the outputs of the power source is connected to the other of the inputs of the rectifier and to the fourth electrode, wherein the power source is in particular a piezo element.

Furthermore, it is also possible to arrange the fourth electrode outside the first area and thus to allow only one item of information to appear or disappear in front of an unchanging background.

According to a preferred embodiment example, the display device furthermore has one or more optical security elements. The optical security elements here are preferably diffractive security elements, security elements containing a thin-film layer system, security elements containing optically variable pigments, security elements containing microlenses or security elements containing liquid crystals. The protection against forgery of the display device can be further increased by these additional security elements.

The display device is preferably formed as a laminating film or transfer film. A laminating film here preferably has a carrier film, a decorative layer and optionally an adhesive layer. The first, second and third electrodes as well as the display layer here are preferably parts of the decorative layer, as well as the above-mentioned optical security elements. In the formation as a transfer film, the display device preferably has a carrier film and a transfer layer that can be detached from the latter, and which has the previously mentioned decorative layer as well as an optional adhesive layer.

The use of the display device as a security element, in particular for the security of value documents or for product assurance, is particularly advantageous. Value documents here are formed in particular by banknotes, ID documents, credit cards, certificates and the like.

BRIEF DESCRIPTION OF THE DRAWINGS

The invention is explained by way of example below with reference to several embodiment examples with the aid of the attached drawings:

FIG. 5a shows a schematic top view of electrodes of a display device, FIG. 5b and FIG. 5c show schematic representations of a top view of an area of the display device according to FIG. 5a, FIG. 6a and FIG. 6b in each case show a schematic top view of an electrode of a display device, FIG. 6c and FIG. 6d in each case show a schematic top view of an area of the display device according to FIG. 6a and FIG. 6b, FIG. 7a shows a schematic top view of electrodes of a display device, FIG. 7b and FIG. 7c show a schematic representation of a top view of the display device according to FIG. 7a, FIG. 8a shows a schematic top view of a section of the electrodes of a display device.

DETAILED DESCRIPTION OF THE INVENTION

Figure 1A:
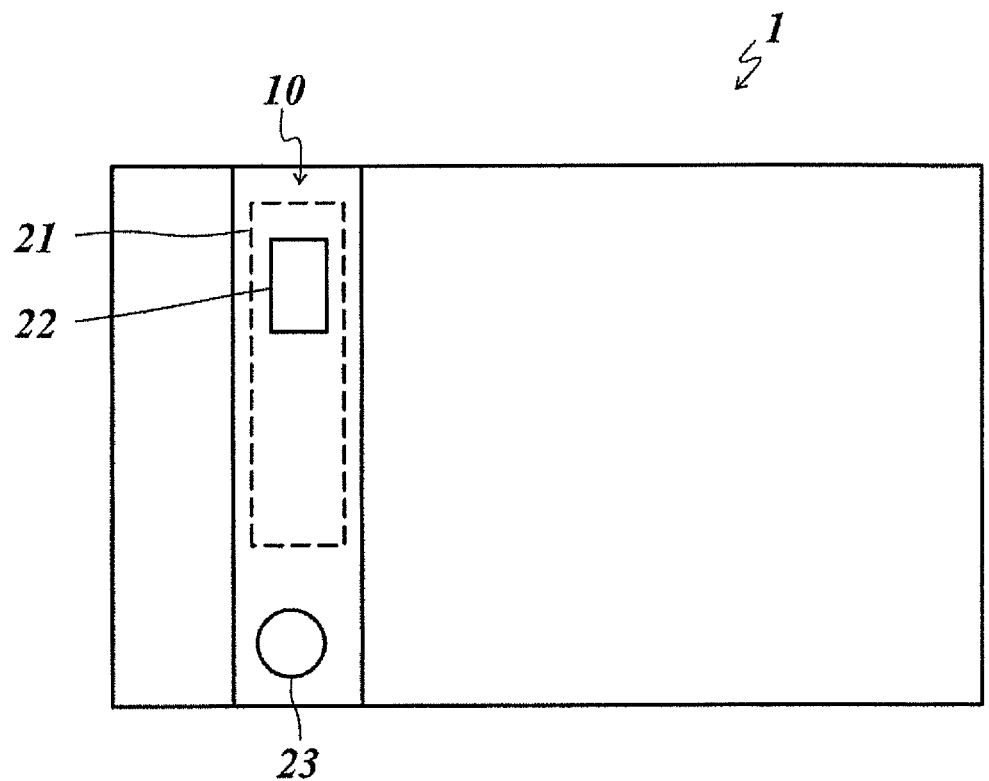
FIG. 1a shows a schematic top view of a value document with a display device.

FIG. 1a shows a value document 1. The value document 1 is for example a banknote, an ID document, for example a passport or a passport card, a credit card, a ticket, a coupon, a lottery ticket, a price tag or a certificate. In the embodiment example according to FIG. 1a, the value document 1 is formed by way of example by a banknote. The banknote here has a carrier substrate which is formed for example from paper, a plastic film or a multi-layer substrate consisting of one or more plastic or paper layers. A display device 10 is applied to the carrier substrate. The display device 10 here can—as shown in FIG. 1a—be applied in the form of a strip to the carrier substrate. However, it is also possible that the display device 10 is applied in the form of a patch to the carrier substrate of the value document 1 or is integrated in the layer structure of the layers of the carrier substrate of the value document 1, thus for example as threads in the window of a value document.

In addition to the display device 10, the value document 1 can have one or more optical security elements, for example watermarks, security imprints, in particular containing optically variable pigments, magnetic, IR-absorbing or UV-fluorescent inks as well as security elements applied to the carrier substrate in the form of films applied to the carrier substrate.

The display device 10 here has an area 22 in which an item of optical information is shown by the layer arrangement described below. Furthermore, the display device 10 preferably also has a power source which is provided inside the layer of the display device 10, for example in the area 21 indicated in FIG. 1a.

The power source is preferably a piezo element which, in the case of mechanical deformation such as bending or folding of the display device 10, generates a voltage pulse. However, it is also possible that the power source is formed by an antenna, a battery or a solar cell, as has also already been explained previously.

The display device preferably also has one or more optical security elements, of which one optical security element 23 is indicated in FIG. 1a. The optical security element 23 here is preferably a diffractive security element which is formed in particular by a volume hologram layer or a diffractive surface relief molded in a replication lacquer layer. Furthermore, it is also possible that one or more such diffractive structures are arranged combined with each other in the optical security element 23. Furthermore, the security element 23 can also be an interference layer system which generates a color shift effect dependent on the angle of view. Such a thin-film layer system preferably has one or more spacer layers, the optical thickness of which corresponds to a half or a quarter of the wavelength of a color in the visible wavelength spectrum. The optical security element 23 can furthermore also have one or more preferably cross-linked liquid crystal layers which generate a color shift effect dependent on the angle of view or a security feature recognizable by means of a polarizer. Furthermore, the security element 23 can also have a microlens layer or refractive relief structures which generate an optically variable effect. The security element 23 here can act both in reflection and in transmission, wherein the carrier substrate of the value document 1 here has a corresponding recess in the area of the security element 23 or the carrier substrate is then formed transparent in this area. The security element 23 here preferably also has one or more metallic layers which preferably serve as a reflective layer and optionally are very finely structured.

It can also be provided that the security element 23 overlaps at least in areas with the area 22 of the display device 10 in order thus to generate an additional optical effect.

The display device 10 can furthermore also have several areas 22 in which an item of optical information is generated as described below by an arrangement with three or more electrodes.

The display device 10 preferably consists of a multi-layer film body which is formed as a laminating film or transfer film. However, it is also possible that the display device—as already stated above—is an integral constituent of the carrier substrate of the value document 1.

The display device 10 thus has for example a carrier film 11, a decorative layer 12 and an optional adhesive layer 13. The carrier layer 11 preferably consists of a plastic film, for example a PET or BOPP film, with a layer thickness of between 16 and 250 μm. In the case of a transfer film, the adhesive force between the carrier film 11 and the decorative layer 12 is set such that it is possible to detach the carrier film 11 from the decorative layer 12. For this, a detachment layer is provided for example between the carrier film 11 and the decorative layer 12. If the display device 10 is formed as a laminating film, the adhesion between the carrier film 11 and the decorative layer 12 is chosen such that, as far as this is possible, such a detachment is not possible. Thus, an adhesion-promoting layer is provided for example between the carrier film 11 and the decorative layer 12. The layer structure of the display device 10 in the area 22 is described below by way of example with reference to FIG. 1c to FIG. 4, FIG. 11a and FIG. 14.

Figure 1B:
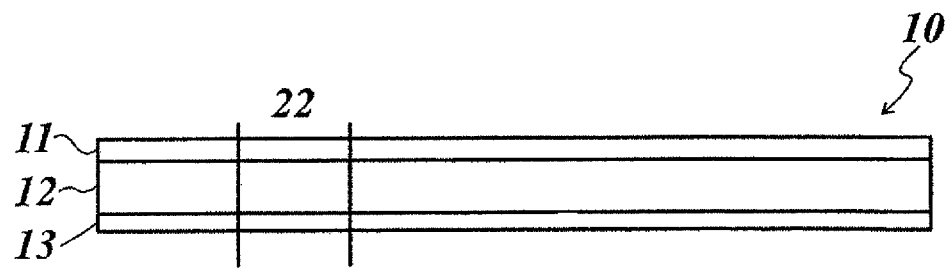
FIG. 1b shows a schematic sectional representation of the display device according to FIG. 1a, FIG. 1c shows a schematic sectional representation of a section from the display device according to FIG. 1b.
Figure 1C:
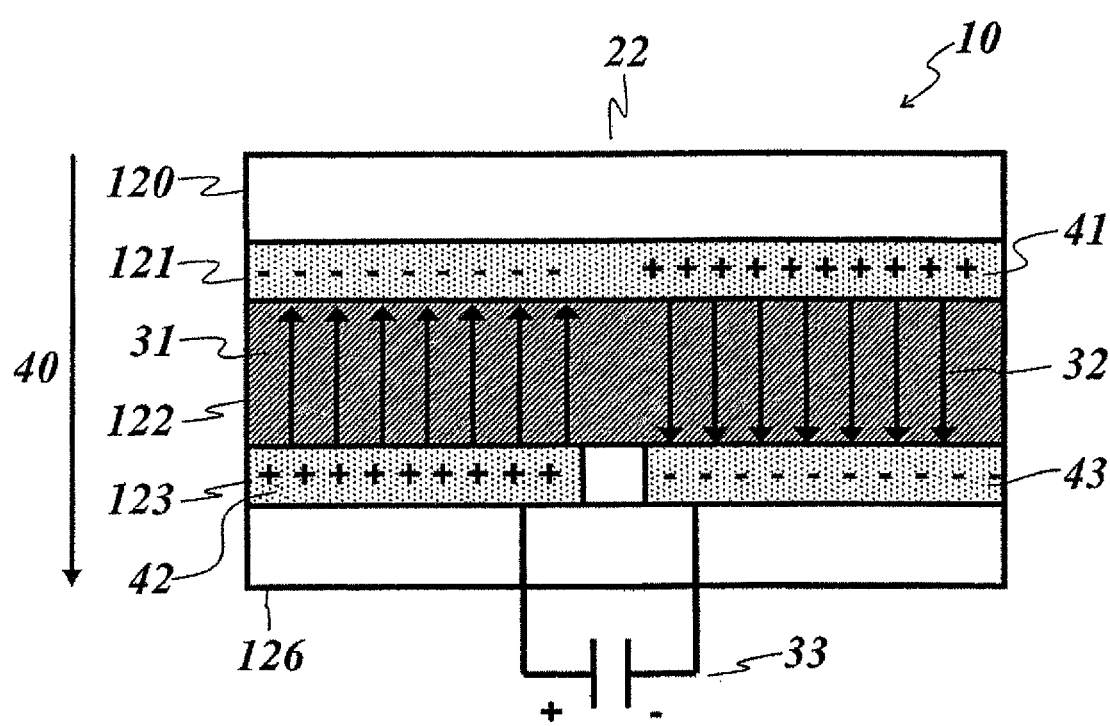

FIG. 1c illustrates a first embodiment variant of the structure of the display device 10 in the area 22.

In the area 22, the display device 10 has a dielectric layer 120, an electrically conductive layer 121, a display layer 122, an electrically conductive layer 123 and dielectric layer 126. In addition to these layers, the display device can also have one or more further layers in the area 22, for example further electrically conductive layers, further dielectric layers, adhesion-promoting layers, color layers, etc.

The electrically conductive layers 121 and 123 consist of an electrically conductive material, for example of ITO or PEDOT or of a metallic material, for example aluminum, silver, copper, gold or an alloy of these metals. The layer thickness of the electrically conductive layers 121 and 123 is between 1 nm and 500 nm, further preferably between 5 nm and 250 nm.

Preferably, the electrically conductive layer 121 here is formed transparent or semi-transparent and in particular is formed of a transparent electrically conductive material. Preferably, the electrically conductive layer 123 is furthermore formed of an (opaque) metallic material. It is thus possible to observe the optical effect arising in the area 22 in the display layer 122 from the top side, i.e. from the sides of the carrier film 11. However, it is also possible that the electrically conductive layers 123 and 121 are arranged in reverse order and the layer 123 is formed transparent and the layer 121 is formed opaque. Furthermore, it is also possible that both electrically conductive layers 121 and 123 are formed transparent and thus the optical effect arising in the display layer 122 can also be observed with light passing through or in front of the background of a further item of optical information which is arranged in the display device 10 or is arranged in the carrier substrate of the value document 1.

The dielectric layers 120 and 126 are formed by a varnish layer made of a dielectric varnish or by a dielectric film. The dielectric layer 120 is preferably formed by the carrier film 11.

An electrode 41 is formed in the electrically conductive layer 121 or the electrically conductive layer 121 is provided in the form of an electrode 41. Two electrodes 42 and 43 are shaped in the electrically conductive layer 123. As represented in FIG. 1c, the electrode 41 overlaps the electrodes 42 and 43 in each case at least in areas, preferably completely. The overlapping here relates to a direction 40 which is formed by the surface normal from the plane spanned by the display layer 122 or the electrically conductive layer 121. The layers 121 and 122 here preferably have a width and length extent that is significantly greater than their thickness, with the result that the corresponding plane is clearly defined by this layer. If this is not the case, the plane is defined by one of the surfaces of these layers.

The electrode 41 is formed as an isolated electrode. The electrode 41 is thus not galvanically connected to an electric potential and in particular not to a current source or voltage source, and also is not connected to connection elements which could make it possible to connect the electrode 41 galvanically to a current or voltage source or to an electronic circuit. The isolated electrode 41 is preferably completely surrounded by dielectric material, with the result that a charge inflow or outflow from the electrode 41 is not possible or is possible only with difficulty. Thus, the edges of the electrode 41, which are not shown in FIG. 1b, are preferably also likewise covered with a dielectric material.

Furthermore, it is also possible that the dielectric layer 120 is connected outside the electrode 41 to the surface of the display layer 122 or a further dielectric layer arranged between the display layer 122 and the electrode 41, with the result that the electrode 41 is encapsulated by the dielectric layer 120 and the display layer 122 or the dielectric layer arranged between the display layer 122 and the electrically conductive layer 121. Depending on the internal resistance of the display material used, a small leakage current can flow to the electrodes 42 and 43 over the display layer 122. This can be advantageous, as the bistable behavior of the display device can be influenced via this within certain limits.

If the electrodes 42 and 43, as shown in FIG. 1c, are now connected to an electrical voltage source 33, the idealized field line profile indicated in FIG. 1c results inside the display layer 122. In a first area in which the electrodes 41 and 42 overlap, the electric field lines are oriented in a first direction 31 and, in a second area in which the electrode 41 and the electrode 43 overlap, the field lines are oriented in an opposite direction 32.

The display layer 122 now preferably has a display material which shows different optical properties when the electric field lines are oriented differently, i.e. shows first optical properties in the first area with the orientation of the field lines in direction 31 and shows second optical properties in the second area with the orientation of the field lines in direction 32. The different optical properties here are preferably a different color in the first area and the second area, such as for example a black/white contrast, a red/white contrast or a green/yellow contrast.

The display layer 122 preferably has, as display material, spheres or chambers filled with liquid in which a plurality of electrically charged particles are dispersed. Here, the optical properties of the liquid and of the particles can differ from each other, with the result that either the particles or the liquid are visible in the area 22 depending on the direction of the electric field lines. Furthermore, it is also possible that the spheres or chambers have in each case a plurality of first particles and a plurality of second particles which differ in relation to their electric charge and in relation to their optical properties. Thus, in the simplest case, the first particles can be positively charged and have a first color, and the second particles can be negatively charged and have a second color, differing from the first color. Depending on the profile of the field lines, the first color or the second color is then shown in the area 22.

The spheres or chambers here preferably have a width/length of from 10 μm to 500 μm and a thickness of from 10 μm to 100 μm. The particles preferably have a diameter of between 0.1 μm and 10 μm, further preferably between 0.1 μm and 5 μm.

Figure 2:
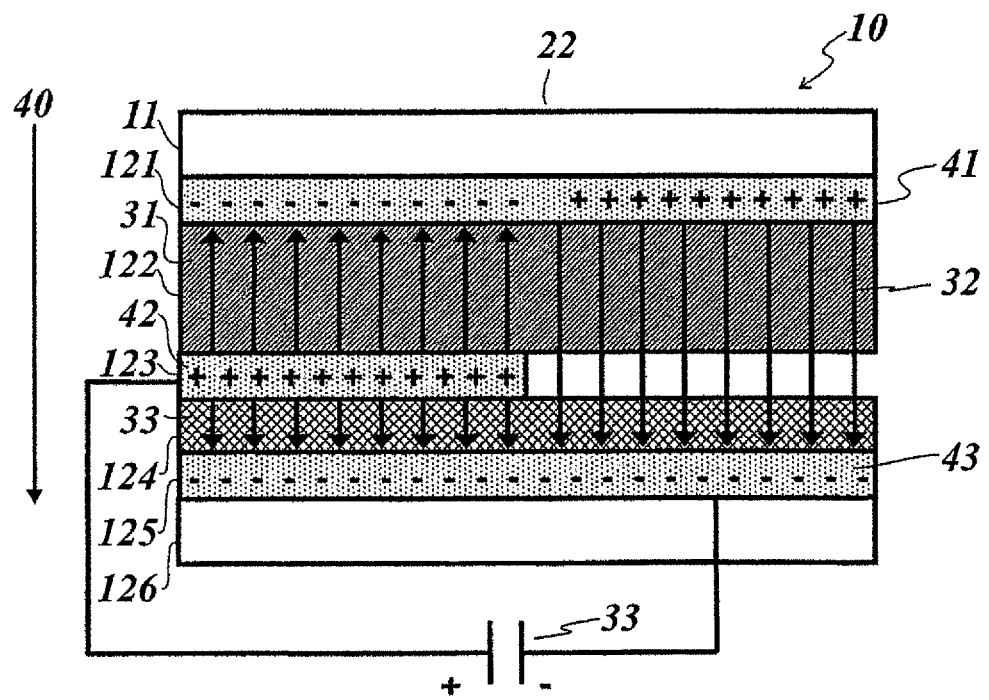
FIG. 2 shows a schematic sectional representation of a section of a display device.

FIG. 2 shows a further embodiment variant of the structure of the display device 10 in the area 22.

The display device 10 is constructed in the area 22 as described in relation to FIGS. 1a to 1c, with the following difference:

Only one of the two electrodes 42 and 43 is shaped in the electrically conductive layer 123. Furthermore, an additional dielectric layer 124 as well as a further electrically conductive layer 125 is provided between the electrically conductive layer 123 and the dielectric layer 126. The electrode 43 is formed in the electrically conductive layer 125.

The electrodes 42 and 43 are thus formed in different layer planes of the display device 10 and have a different distance from the electrode 41. The form, local layer thickness and the material properties of the dielectric layer 124 are adapted to an optimum switching behavior of the display. The electrically conductive layers 121, 123 and 125 and thus the electrodes 41, 42 and 43 are preferably arranged parallel to each other.

As shown in FIG. 2, the electrode 43 is in particular also formed in areas of the electrode 42 (in relation to the direction 40), with the result that the electrodes 42 and 43 overlap at least in areas, preferably over the whole surface. However, as shown in FIG. 2, an additional electric field 33 is hereby formed between the electrodes 42 and 43. The capacitance $c_{23}$ formed by this overlapping of the electrodes 42 and 43 is interconnected parallel to the capacitance $c_{12}$ formed by the overlapping of the electrodes 41 and 42 and the capacitance $c_{13}$ formed by the overlapping of the electrodes 41 and 43, with the result that the strength of the electric field formed between the electrodes 41 and 42 and 41 and 43 is weakened by this overlapping. The above-named capacitances here can be influenced correspondingly by the choice of the spacing of the electrodes 41 and 42 as well as 41 and 43 and via the choice of the dielectricity constant of the dielectric layer 124 as well as the overlap surface area of the electrodes 42 and 43, with the result that this increase in capacitance does not lead to a negative influencing of the display result. It has proved particularly worthwhile here to choose the distances such that $c_{23} < 1/(1/c_{12} + 1/c_{13})$.

In the embodiment example according to FIG. 2, the first overlap area is formed by the area in which the electrodes 41 and 42 overlap in relation to the direction 40. The second overlap area is formed by the area in which the electrodes 41 and 43 overlap and the electrodes 41 and 42 do not overlap, as can also be seen from the representation according to FIG. 2. If the previously described display medium is used, a correspondingly different optical effect is generated in the first overlap area and in the second overlap area when an electrical voltage is applied, as set out above.

For the rest, reference is made to the previous statements regarding FIG. 1a to FIG. 1c.

Figure 3:
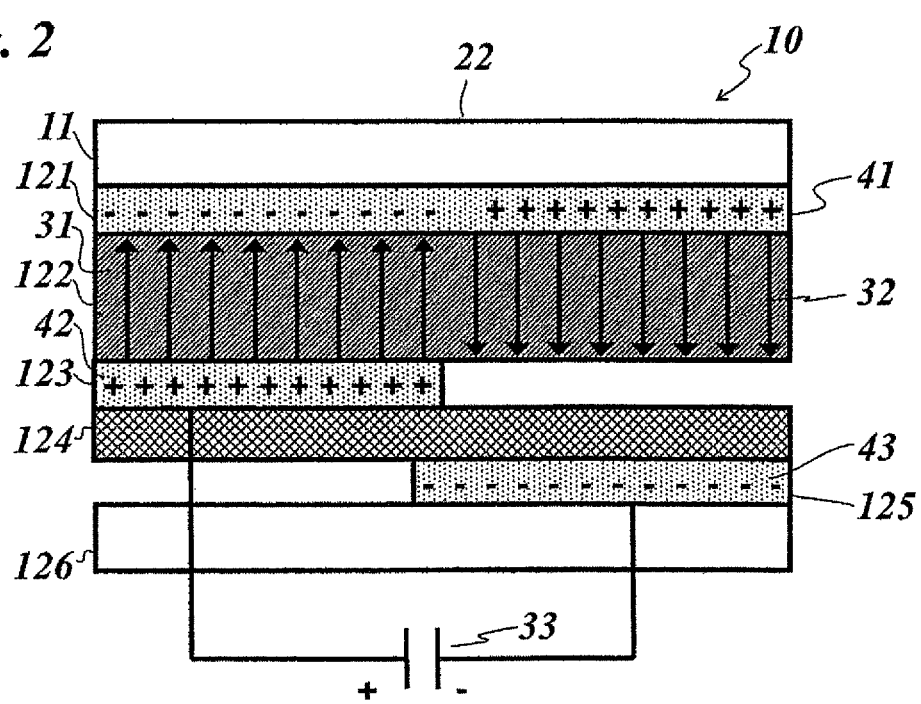
FIG. 3 shows a schematic sectional representation of a section of a display device.

FIG. 3 shows a further embodiment variant of the structure of the display device 10 in the area 22. The structure according to FIG. 3 here corresponds to the structure according to FIG. 2, with the difference that not only the electrode 42, but also the electrode 43 is structured in relation to the image information to be represented. Here, the electrodes 42 and 43 preferably overlap only by between 1% and 10%. Furthermore, it is also possible that the electrodes 42 and 43 do not overlap, but are only arranged in two different planes. For the rest, reference is made to the statements according to FIG. 1a to FIG. 2.

Figure 4:
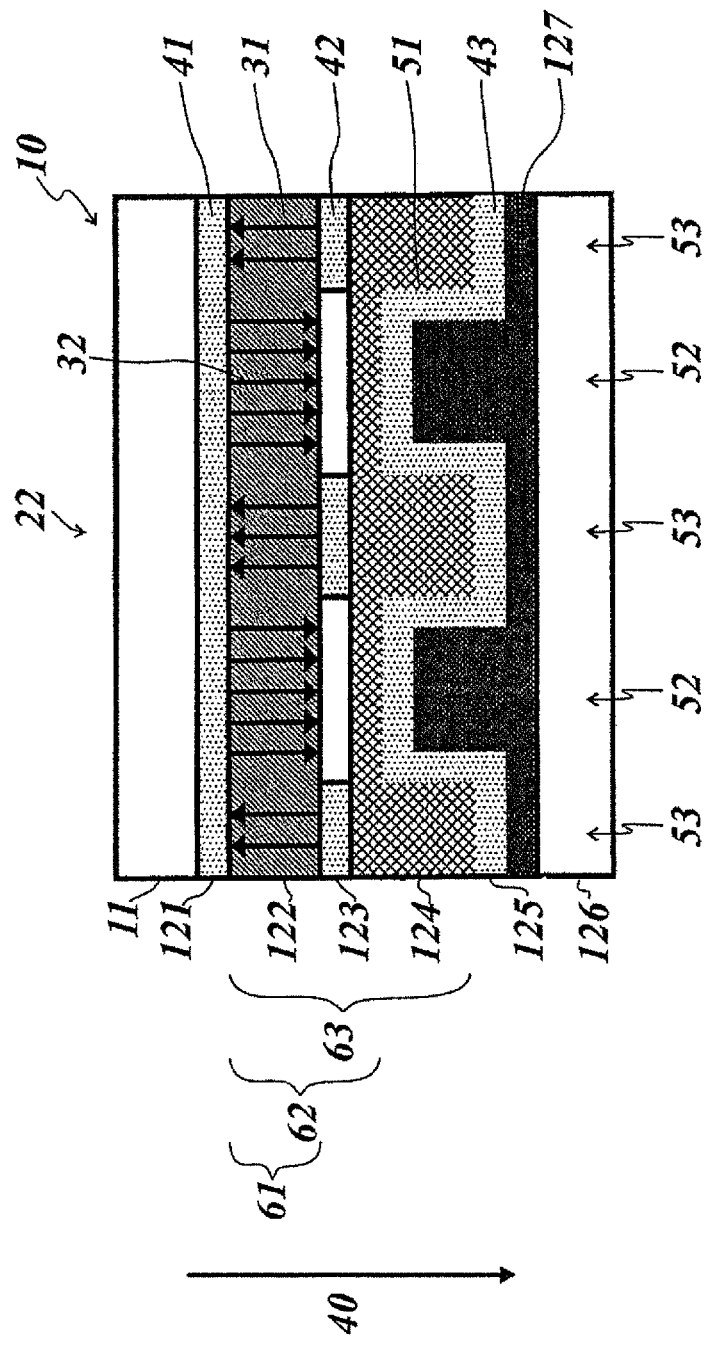
FIG. 4 shows a schematic sectional representation of a section of a display device.

FIG. 4 shows a further embodiment example for the structure of the display device 10 in the area 22.

The structure according to the embodiment example according to FIG. 4 here corresponds to the structure according to the embodiment example according to FIG. 2, with the difference that the electrically conductive layer 125 and thus the electrode 43 in the area 22 does not run in a flat plane, but has elevations and depressions, in relation to the direction 40.

For this, a relief is preferably molded into the electrically conductive layer 125, as shown in FIG. 4. For this, a replication lacquer layer 127 in which a relief structure 51 is molded by thermal replication or UV replication is applied to the dielectric layer 126. The electrically conductive layer 125 is then applied for example by vapor deposition or sputter deposition. Furthermore, it is also possible that the electrically conductive layer 125 is applied to the replication lacquer layer 127 and then the relief structure 51 is molded into the thus-formed multi-layer body by means of thermal replication, with the result that the profile shown in FIG. 4 of the electrically conductive layer 125 results.

The relief structure 51, and thus the electrically conductive layer 125, here has elevations 52 and depressions 53, as shown in FIG. 4. Here, the depressions 53 are preferably provided in the area of the electrode 42, with the result that the distance between the electrode 41 and the electrode 43 is greater in the area of the electrode 42 than in the areas of the area 22 in which only the electrodes 41 and 43 overlap. The relief structure 51 is preferably formed register-accurate relative to the shaping of the electrode 42. The relief structure 51 here preferably has rectangular structure elements, as shown in FIG. 4. However, it is also possible that the relief structure 51 has for example a sinusoidal or wavy shape, wherein in this case the above details in respect of the spacing relate to the average spacing of the electrodes from each other in the respective area. The dielectric layer 124 fills in the depressions/elevations which are brought about by the relief structure 51, with the result that the electrically conductive layer 123 is arranged at least largely parallel to the electrically conductive layer 121.

As shown in FIG. 4, the electrodes 41 and 42 have a distance 61 and the electrodes 41 and 43 are spaced apart from each other by a distance 63 in the area of the electrode 42 and by a distance 62 in the area in which only the electrodes 41 and 43 overlap. The distances 61, 62, and 63 here are preferably chosen such that the distance 61 and the distance 62 are approximately equal and the distance 63 is much greater than the distance 62.

By this choice of the parameters 61, 62 and 63—as already described above—the capacitive load forming due to the overlapping arrangement of the electrodes 42 and 43 can be greatly reduced and the above-described advantages in respect of a complex design of the optical information displayed by the display device in the area 22 can be achieved.

For the rest, reference is made to the statements regarding FIG. 1a to FIG. 3. It is also to be noted here that also in the case of the embodiment example according to FIG. 4 the electrode 43 can be structured in the area of the electrode 42—as shown in FIG. 3—and need not be provided over the whole surface in this area.

Furthermore, it is also possible to combine the embodiments according to FIG. 2 to FIG. 4 with each other and thus for example to choose a structure according to FIG. 2 in a sub-area of the area 22, a structure according to FIG. 3 in a further sub-area and a structure according to FIG. 4 in a further sub-area.

In the following embodiment examples according to FIG. 5a to FIG. 10b, advantageous shapings of the electrodes 42 and 43 for achieving particularly interesting optical effects are described. These embodiment examples can be combined with all of the above-described embodiment variants of the layer structure, thus with all the embodiment variants according to FIG. 1a to FIG. 4.

FIG. 5a shows a top view of the electrically conductive layer 123 in the area 22. In the electrically conductive layer 123 the electrodes 42 and 43 here are shaped separated by an isolation trench. As shown in FIG. 5a, the electrode 42 here is formed in the form of a motif, for example a star. As already stated above, the electrode 42 can also be shaped in the form of any other motif, for example a number, a letter, a symbol, a combination of these elements or also a graphic or figurative representation. The electrode 43 is shaped in the form of a background for the motif. The border line of the background has, according to FIG. 5a, a rectangular shape. However, it is also possible that the border line of the background has any other shape, for example the shape of a circle or also any other desired form.

If a voltage is applied between the electrodes 42 and 43 with such a shaping of the electrodes 42 and 43, for example the item of information 71 shown in FIG. 5b, in which the motif, thus the star, is shown colored white in front of a black background, is shown in the area 22. If the polarity of the voltage applied to the electrodes 42 and 43 is reversed, the item of optical information 72 shown in FIG. 5c is shown, in which the motif, thus the star, is shown colored black in front of a white background. If there is a change in polarity, an inverting representation of the motif thus results, in which the color of the motif and the color of the background are swapped with each other.

FIG. 6a and FIG. 6b show the shaping of the electrodes 42 and 43 in the electrically conductive layers 123 and 125 for an embodiment variant in which the electrodes 42 and 43 are provided in different planes of the display device 10. The electrode 42 is shaped in the form of the motif, in the form of a star here by way of example. The electrode 43 is shaped over the whole surface in the area 22. FIG. 6c and FIG. 6d show the items of optical information 71 and 72 being shown in the area 22 when a voltage of different polarity is applied with a shaping of the electrodes 42 and 43 according to FIG. 6a and FIG. 6b. When there is a change in polarity, an inverted representation of the motif, as already explained above, is also shown here.

Furthermore, reference is to be made to the fact that FIG. 5a to FIG. 6d only illustrate a simple embodiment in respect of the design of the electrodes 42 and 43 to explain the operating principle. Thus, it is also advantageous in particular to use more complex motifs which are constructed from several partial motifs spatially separated from each other. In this case, according to the above-described operating principle the electrode 42 and/or the electrode 43 are formed in the form of partial electrodes, in each case shaped according to the shape of the partial motif, which are galvanically connected to each other by strip conductors. The connection strip conductors, which should not be optically recognizable as far as possible, are preferably shaped in a width of less than 300 μm, further preferably less than 100 μm. Furthermore it is also possible that the above-described background area does not completely enclose the motif or that further intermediate areas are also provided in which neither the electrode 42 nor the electrode 43 overlaps the electrode 41 and in which for example a mixed color between the colors of the motif/background is thus shown.

It is particularly advantageous to mold the electrodes 42 and/or 43 such that when there is a change in polarity the illusion of a movement effect is generated by the voltage applied to these electrodes. A simple embodiment example of such a movement effect is now explained with reference to FIG. 7a to FIG. 7c.

FIG. 7a shows the formation of the electrodes 42 and 43 in the electrically conductive layer 123 in the area 22. The electrode 42 and the electrode 43 consist of a plurality of partial electrodes 421 and 431, which are galvanically connected to each other by connection strip conductors (not shown in FIG. 7a). The connection strip conductors here are preferably arranged outside the area 22. As indicated in FIG. 7a, the partial electrodes 431 and 421 here are shaped in each case in the form of a segment of an object, a rotationally symmetrical image (circle) here, and arranged alternating next to each other. A partial electrode 431 is thus followed by a partial electrode 421, which in turn is followed by a partial electrode 431.

When a first voltage is applied, the item of information 71 shown in FIG. 7b is thus shown in which the areas underlaid with the partial electrodes 431 appear dark and the areas occupied by the partial electrodes 421 appear light. When there is a change in polarity of the voltage, the item of optical information 72 shown in FIG. 7c in which the areas occupied by the partial electrodes 431 appear white and the areas occupied by the partial electrodes 421 appear black results. For the observer, the illusion of the movement of the segments of the object thus results when there is a change in polarity.

The embodiment example described in FIGS. 7a to 7c can furthermore also be realized in a structure of the display device according to FIG. 2 to FIG. 4. In this case, the electrode 42 is structured according to FIG. 7a and the electrode 43 is provided for example over the whole surface in the entire area of the object.

It is also possible to apply the above-described operating principle in various ways. Thus, it is possible for example to divide a differently shaped object and not only a rotationally symmetrically shaped object into segments or also not to arrange the segments rotationally symmetrically, but to arrange them as desired. In addition, the structure described later with reference to FIG. 11a to FIG. 12 can also be used to display objects with different phases of a movement when there is a change in polarity and thus to generate the illusion of the movement of an object as optical effect.

With reference to FIG. 8a to FIG. 10b, different embodiment examples are explained in which the generation of a grayscale image is made possible by skillful design of the electrodes 42 and 43. For example, it is hereby possible to generate the inversion of a grayscale image as optical effect when there is a change in polarity on the electrodes 42 and 43. As already stated above, by a grayscale image is meant here not only an image which is formed from the mixture of the colors black and white, but also an image which is generated from the mixture of any other two colors. It is particularly advantageous here to mix colors differing from black and white, for example red, blue or green, in pairs, with the result that optically impressive and interesting color effects can be generated and the illusion of a true-color image can also be generated by corresponding choice of the primary colors.

According to the color values formed, the corresponding primary colors for achieving these color values in the color space are thus selected and for example in the display material the liquid is chosen in the first primary color and the particles are chosen in the second primary color or the first particles are chosen in the first primary color and the second particles are chosen in the second primary color. Depending on the proportion of surface covered by the first overlap areas, in which the electrodes 41 and 42 overlap, and the second overlap areas, in which the electrode 41 only overlaps the electrode 43, then the mixed color generated in the respective area results through additive color mixing.

Figure 8A:
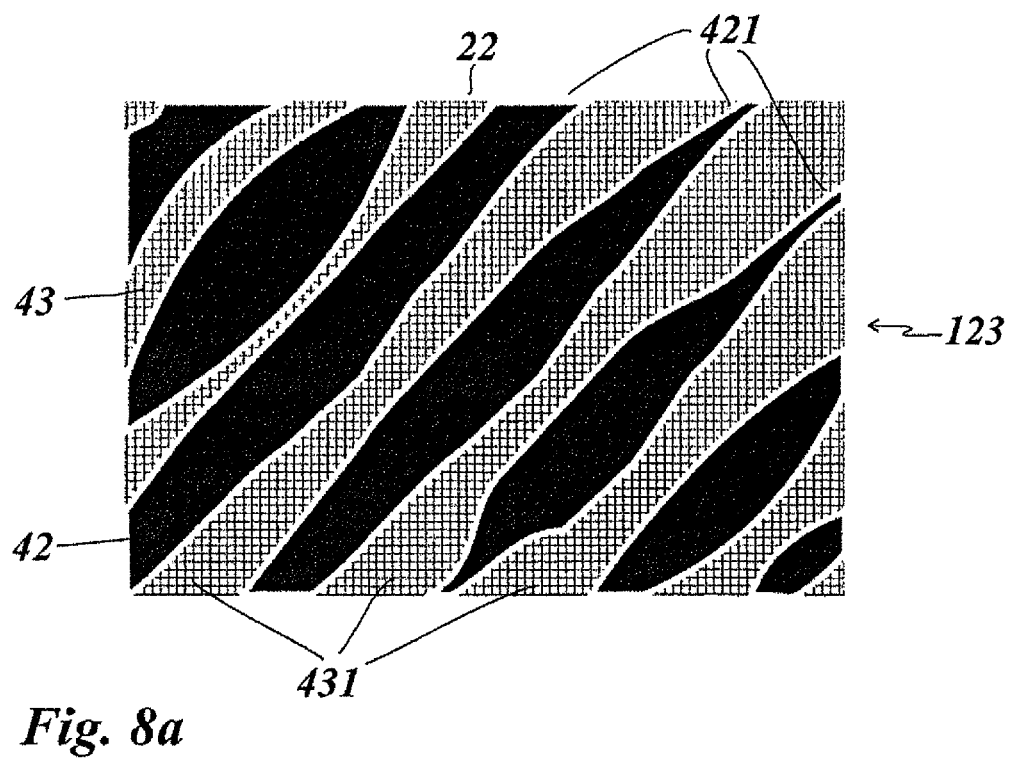
FIG. 8b shows a schematic top view of an area of the display device according to FIG. 8a, FIG. 9a and FIG. 9b in each case show a schematic top view of a section of an electrode of a display device, FIG. 9c and FIG. 9d in each case show a schematic top view of an area of the display device according to FIG. 8a and FIG. 9b.
Figure 8B:
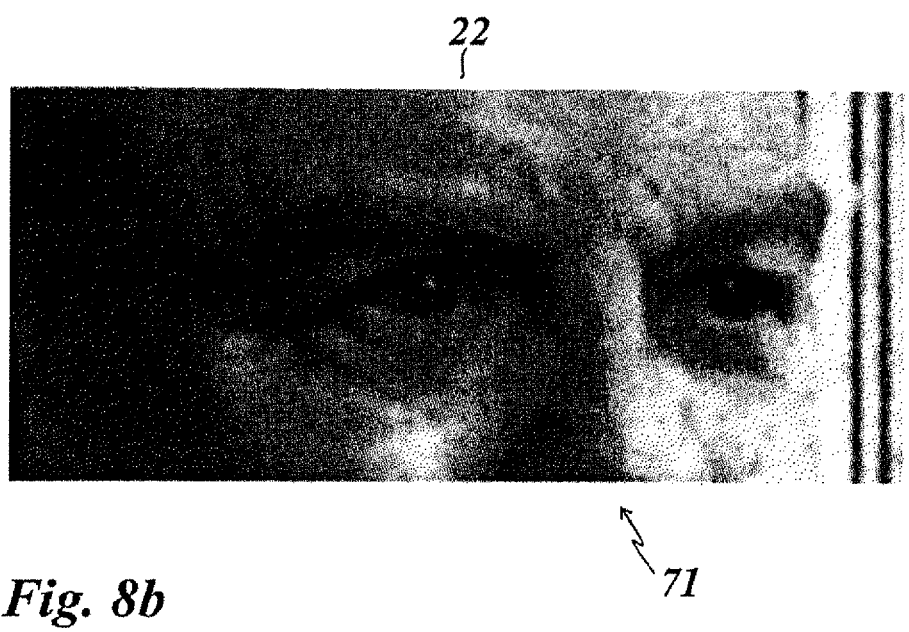

By way of example, the item of optical information 71 being shown in the area 22 when a voltage is applied to the electrodes 42 and 43 is illustrated in FIG. 8b. To produce this item of optical information, the electrodes 42 and 43 here are shaped for example in the manner explained in FIG. 8a.

FIG. 8a shows the structuring of the electrically conductive layer 123 in a partial area of the area 22. The electrodes 42 and 43 have a plurality of partial electrodes 421 and 431 respectively which are arranged according to a one- or two-dimensional grid and are galvanically connected to each other in each case. The grid has a grid width of less than 300 µm, preferably less than 200 µm, further preferably less than 100 µm, with the result that an additive color mixing of the first and second overlap areas takes place when viewed by a human observer. As shown in FIG. 8a, it is particularly advantageous to use a one-dimensional grid here. The respective color value or gray tone in the respective image spot is now set by the respective width of the partial electrodes 421 or 431, as shown in FIG. 8a. Furthermore, it is also possible to set the corresponding color values by corresponding variations of the grid spacings.

Figure 9A:
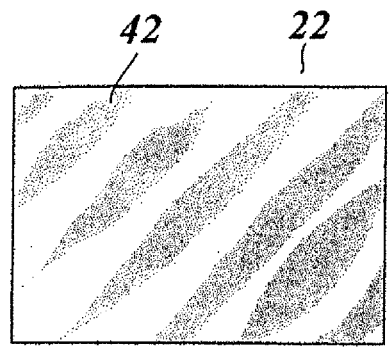
Figure 9B:
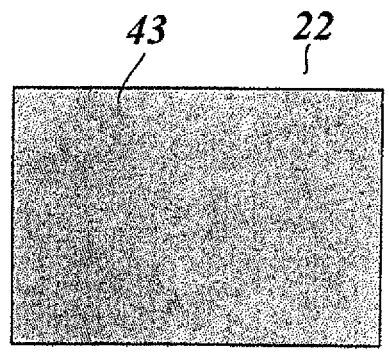
Figure 9C:
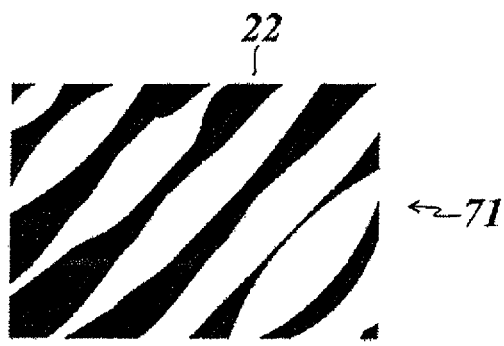
Figure 9D:
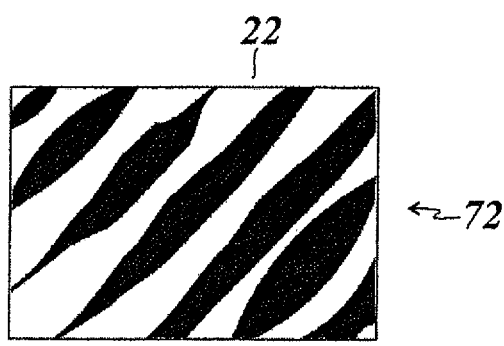

Furthermore, it is also possible to arrange the electrodes 42 and 43 in different planes, as already explained above. Thus, the electrode 42 can be shaped for example as shown in FIG. 9a and the electrode 43 can be shaped over the whole surface in the area 22 as shown in FIG. 9b. When a voltage is applied to the electrodes 42 and 43, for example the item of information 71 shown in FIG. 9c thus results, in which for example the first overlap area appears white and the second overlap area appears black. When there is a change in polarity, the inverted item of information 72 shown in FIG. 9d results, in which for example the first overlap area appears black and the second overlap area appears white. An inverted color mixture hereby results when there is a change in polarity.

Figure 10A:
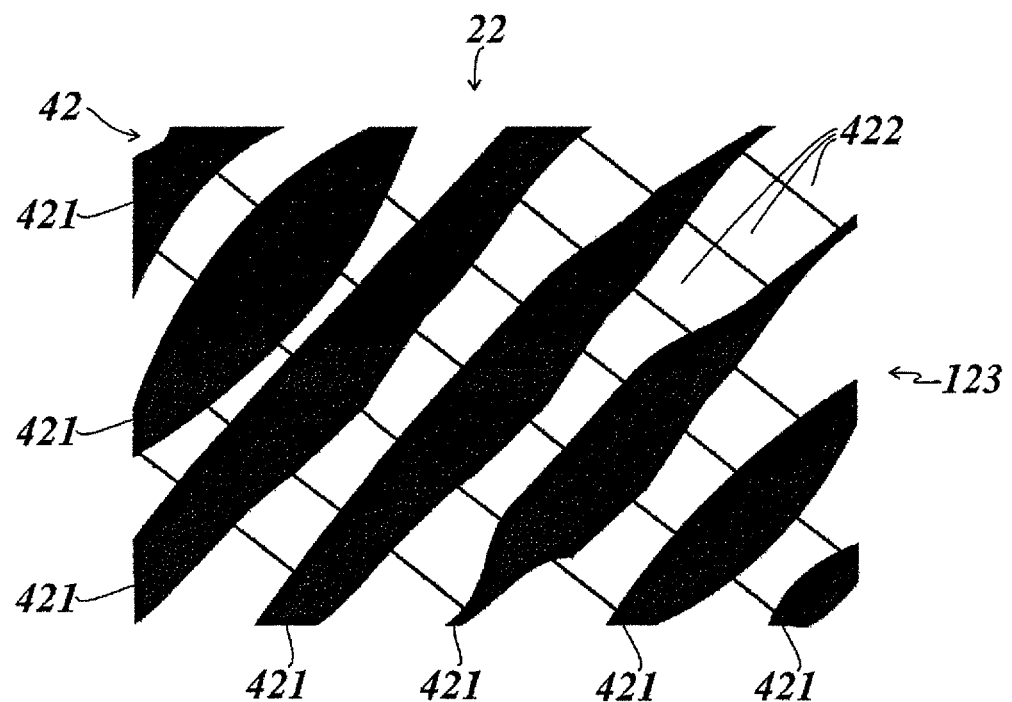
FIG. 10a shows a schematic top view of a section of an electrode of a display device.

FIG. 10a illustrates a particularly advantageous design of the electrode 42. As shown in FIG. 10a, the electrode 42 is constructed from a plurality of partial electrodes 421 which are connected to each other via a plurality of connection strip conductors 422. The connection strip conductors 422 here are arranged according to a further grid. The strip conductors 422 preferably have a width of less than 100 µm, further preferably less than 50 µm.

Figure 10B:
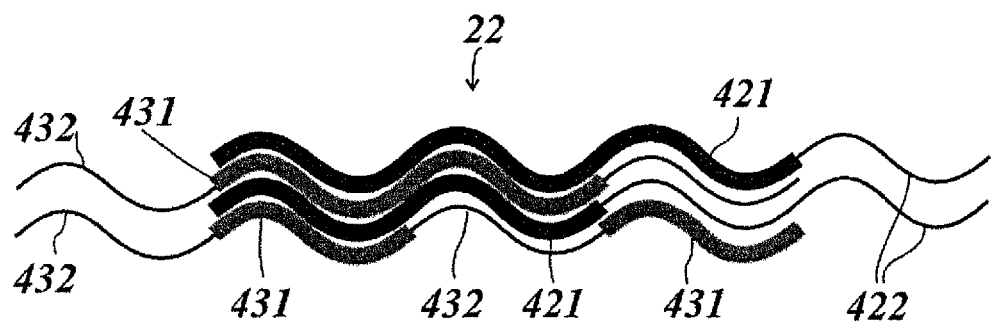
FIG. 10b shows a schematic top view of a section with electrodes of a display device.

FIG. 10b illustrates a further possible arrangement and shaping of the electrodes 42 and 43 for the formation of a grayscale image. As illustrated in FIG. 10b, the electrodes 42 and 43 have in each case a plurality of partial electrodes 421 and 431 which are arranged alternating according to a one-dimensional grid. The partial electrodes 421 and 431 here are formed linear, wherein the line here has a pattern in the shape of a wavy line. The partial electrodes 421 and 431 are connected to each other by strip conductors 432.

Here too, the color mixture is set by the corresponding proportion of surface covered by the first overlap areas and the second overlap areas in the respective image spot.

Figure 11A:
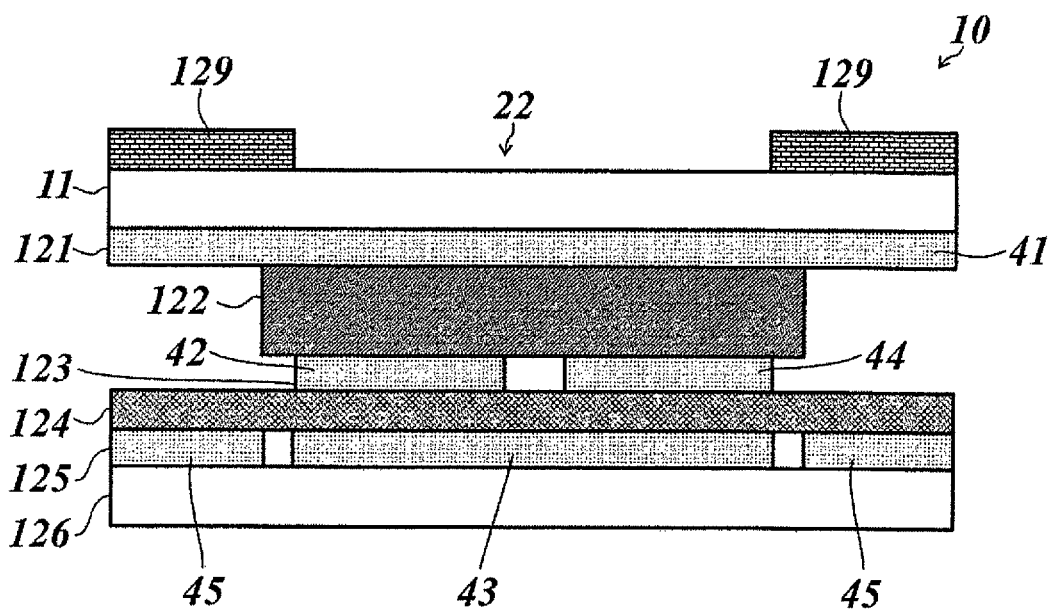
FIG. 11a shows a schematic sectional representation of a section of a display device.

FIG. 11a shows a further embodiment of the structure of the display device 10 in the area 22.

The display device is constructed like the display device according to FIG. 1a to FIG. 4, with the following differences:

A further electrode 44 is still further provided which likewise overlaps with the electrode 41 at least in areas and which is provided on the same side of the display layer 122 as the electrodes 42 and 43. Furthermore, an additional further electrode 45 is also optionally provided which is likewise provided on the side of the display layer 122 facing the electrodes 42 and 43 and which is likewise provided overlapping at least in areas with the electrode 41. In addition, a masking layer 129 is also optionally provided which is provided above the electrode 41 in the direction of view and consists for example of an opaque imprint.

The section of the display device 10 shown in FIG. 11a thus has the masking layer 129, the dielectric layer 11, the electrically conductive layer 121, the display layer 122, the electrically conductive layer 123, the dielectric layer 124, the electrically conductive layer 125 and the dielectric layer 126. The electrodes 42 and 44 are shaped in the electrically conductive layer 123 and the electrodes 43 and 45 are shaped in the electrically conductive layer 125. In respect of the design of these layers and the shaping of the electrodes, reference is made to the previous statements regarding FIG. 1a to FIG. 10b.

In the simplest case, the electrode 45 is not provided and, in addition to the electrodes 42 and 43, only the electrode 44 is provided, which is arranged between the electrode 43 and the display layer 122. The electrodes 42 and 44 can also be provided in different planes of the display device 10 and are formed by different electrically conductive layers of the display device spaced apart from each other, as has already been explained in detail above. It is particularly advantageous here that the electrode 43 is arranged underneath the electrodes 42 and 44.

The electrode 42 is shaped in the form of a first item of information, for example shaped in the form of a motif, for example a star, as shown in FIG. 6a. The electrode 44 is formed in the form of a second item of information, for example likewise shaped in the form of a motif, for example a letter or a number or a symbol. The electrode 43 preferably forms a background for the first item of information and the second item of information and is thus provided for example, as shown in FIG. 6b, over the whole surface in the area of the background, or provided only in the areas of the electrode 41 not overlapped by the electrodes 42 and 44, as shown for example in FIG. 5a, or is likewise structured and not provided at least partially in the areas overlapping with the electrodes 42 and 44, as shown for example in FIG. 3.

Depending on the application of a voltage to the electrodes 42, 44 and 43, the optical effect being shown to the observer differs: if one pole of the voltage source is connected to the electrode 42 and the other pole of the voltage source is connected to the electrode 44 and the electrode 43, the first item of information is shown. If the polarity is changed here, an inverted representation of the first item of information is shown. If one pole of the voltage source is connected to the electrode 44 and the other pole of the voltage source is connected to the electrode 42 and the electrode 43, the second item of information is shown. When the polarity is reversed, the second item of information is shown in inverted representation. If the electrode 43 is connected to a constant voltage potential and the polarity of the voltage source applied to the electrodes 42 and 44 is changed, then—if the background stays the same—the representation changes between the first and second items of information when there is a change in polarity.

In addition, it is possible by the use of the electrode 45 to display only the background area without first and second items of information, also in inverted representation. For this, it is advantageous if the electrode 45 does not overlap the display layer 122 or area of the display layer 122 with the display material and/or that the electrode 45 is overlapped over the whole surface by the masking layer 129. To achieve this effect, one pole of the voltage source is connected to the electrode 45 and the other pole of the voltage source is connected to the electrode 43 and/or the electrodes 42 and 44.

Figure 11B:
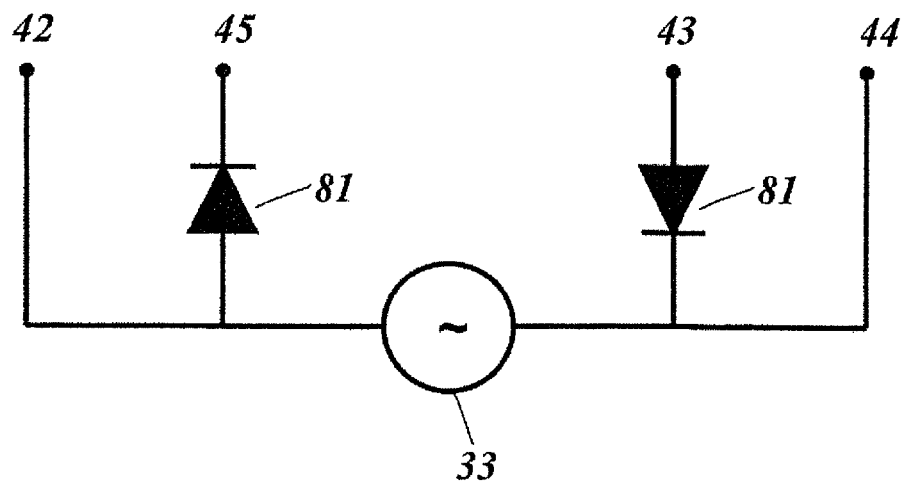
FIG. 11b shows a circuit diagram for a possible contacting of the electrodes of the display device according to FIG. 11a, FIG. 12a to FIG. 12d in each case show a schematic top view of one or more electrodes of a display device, FIG. 12e, FIG. 12f, FIG. 12h and FIG. 12i in each case show a top view of one or two electrodes of a display device, FIG. 12g and FIG. 12j in each case show an enlarged representation of a top view of an area of the display device according to FIG. 12e, FIG. 12f, FIG. 12h and FIG. 12i when different voltage potentials are applied, FIG. 13a and FIG. 13b in each case show a schematic top view of two electrodes of a display device, FIG. 13c to FIG. 13e in each case show a schematic top view of one or more electrode planes of the display device according to FIG. 13a and FIG. 13b when a first voltage is applied, FIG. 13f to FIG. 13h in each case show a top view of one or more electrode planes of the display device according to FIGS. 13a to 13b when a second voltage is applied

FIG. 11b shows an advantageous interconnection of the electrodes 42, 43, 44 and 45 with a power source 33 preferably arranged in the display device 10. The power source 33 here is preferably a piezo element, which generates a voltage pulse of different polarity depending on the bending direction. As shown in FIG. 11b, a rectifier, formed as a half-wave rectifier with the diodes 81 here, is provided between the electrodes 43 and 45 and the poles of the voltage source 33 here. It is ensured by the rectifier that the electrodes 43 and 45 are occupied by a predetermined electric potential irrespective of the polarity of the voltage pulse generated by the power source 33. Instead of a half-wave rectifier, a bridge rectifier can also be used. Depending on the bending direction, the first or the second item of information is thus represented in the area 22, with the result that a very striking security feature can be generated with very little outlay on circuit technology.

As already stated further above for the shaping of the electrode 42, the electrodes 42 and 44 can in each case have several partial electrodes which are shaped in each case in the form of a partial motif of the respectively represented motif and which are connected to each other by strip conductors.

It is furthermore particularly advantageous if the electrodes 42 and 44 are shaped such that the first and second items of information appear in one and the same area from the point of view of the human observer. A shaping of the electrodes 42, 44 and 43 that is suitable for this is described below by way of example with reference to FIG. 12a to FIG. 12j.

Figure 12A:
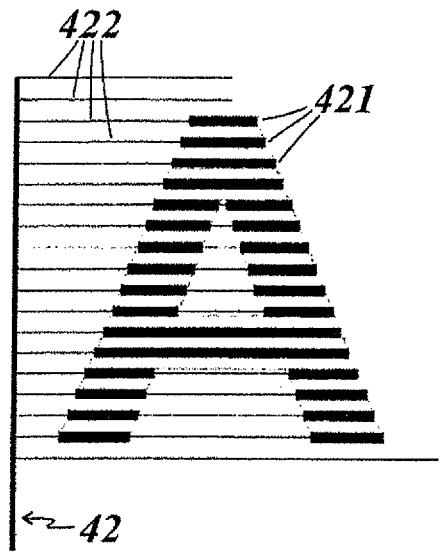

FIG. 12a shows the shaping of the electrode 42. The electrode 42 has a plurality of partial electrodes 421 which are galvanically connected to each other via strip conductors 422. These partial electrodes 421, as shown in FIG. 12a, here are shaped and arranged such that they form a first item of information, here the letter "A". The partial electrodes 421 have in each case a width of less than 300 μm and are preferably, as shown in FIG. 12a, arranged according to a regular, one-dimensional grid. Furthermore, it is also possible that the partial electrodes 421 have another shape, for example the shape of a spot or square, and/or are arranged according to a two-dimensional grid.

In order to generate the pattern according to which the electrode 42 is structured, the item of information to be represented, for example the letter "A", is thus scanned according to the grid and a partial electrode 421 is provided in the corresponding grid line if a foreground area of the item of information is provided there, wherein the length of the partial electrode 421 and its arrangement corresponds to the length of the foreground area along the respective grid line.

Figure 12B:
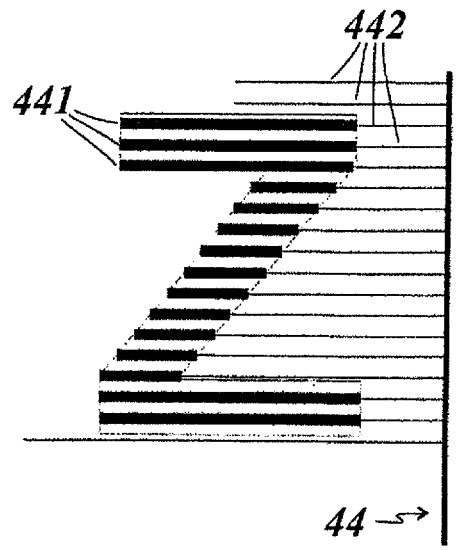

FIG. 12b shows a corresponding formation of the electrode 44. This also has a plurality of partial electrodes 441 which are galvanically connected to each other via strip conductors 442. The partial electrodes 441 likewise have in each case a width of less than 300 μm and are likewise arranged according to a one- or two-dimensional grid. In respect of the generation of the pattern according to which the electrode 44 is structured, reference is made to the previous statements regarding FIG. 12a. The grids chosen for the electrodes 42 and 44 are correspondingly matched to each other such that it is possible to grid the partial electrodes 421 and 441 in each other.

Figure 12C:
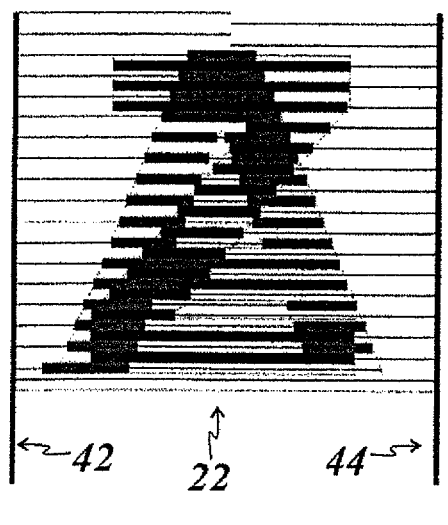

A corresponding gridding of the electrodes 42 and 44 in each other is shown by way of example in FIG. 12c. In the case shown in FIG. 12c, grids which are shifted relative to each other by half a period in each case are used for the electrodes 42 and 44, with the result that, as shown in FIG. 12c, partial electrodes 421 and 441 are provided alternating. The partial electrodes 421 and 441 here can be shaped in one and the same electrically conductive layer, or also can be shaped in different electrically conductive layers arranged one above the other and can be aligned register-accurate relative to each other.

Figure 12D:
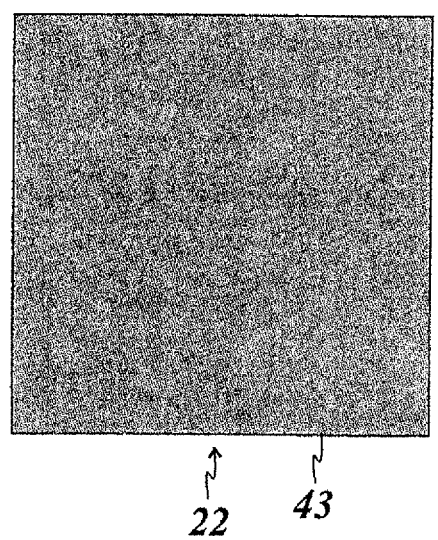

FIG. 12d furthermore shows the shaping of the electrode 43 in the area 22. The electrode 43 here is provided over the whole surface in the area 22 and forms the background for the two items of information formed by the electrodes 42 and 44. As already stated above, the border line of the electrode 43 or the shape of the electrode 43 can have another shape, with the result that the background is designed accordingly patterned.

In the corresponding design of the electrodes 42, 44 and 43 according to FIG. 12e and FIG. 12f, in the area 22 the item of information 71 shown in FIG. 12g is thus shown when a voltage is applied and the item of information 72 shown in FIG. 12j is shown when an inverted voltage is applied.

It is to be pointed out that FIGS. 12a to 12j only represent schematic figures and that, because of the formation of the width of the partial electrodes 421 and 441, the gridding of the items of information 71 and 72 disappears for the human observer and thus, in one and the same area, a "Z" is visible as item of information 71 and an "A" is visible as item of information 72 depending on the polarity of the voltage.

In addition, a further advantageous embodiment is illustrated with reference to FIG. 13a to FIG. 13h.

In these embodiment examples, the electrodes 42 and 44, as already explained previously with reference to FIG. 12a to FIG. 12j, firstly have a plurality of partial electrodes 421 and 441 which are connected to each other by means of strip conductors 422 and 442 respectively. The partial electrodes 421 and 441 are gridded in each other and in each case form a respective item of information, for example a square and a circle. In respect of the formation of the partial electrodes 421 and 441 and their arrangement, reference is made to the statements in this respect regarding FIG. 12a to FIG. 12j.

In addition, the electrodes 43 and 45 also have in each case a plurality of partial electrodes 431 and 451 respectively, which are galvanically connected to each other by means of strip conductors 432 and 452 respectively. The partial electrodes 431 and 451 here have in each case a width of less than 300 μm and are arranged according to a respective grid, wherein the grids are chosen in each case such that the partial electrodes 431 and 451 are gridded in each other, as shown in FIG. 13a. The partial electrodes 431 and 451 are thus shaped and arranged in principle like the partial electrodes 421 and 441, with the result that reference is made to the statements in this respect regarding FIG. 12a to FIG. 12j.

Unlike the partial electrodes 421 and 441, the partial electrodes 431 and 451 are both guided over the entire area of the background and thus do not form different motifs.

Here, the gray tone or color value (if different primary colors are used for the liquid/particles) which is visible for the observer in the respective area of surface is fixed by the proportion of surface covered by the partial electrodes 431 and 451 in the respective area of surface. With the uniform shaping of the partial electrodes 431 and 451 shown in FIG. 13a, and thus with identical surface-coverage density over the entire area 22, the gray tone or color value of the color value generated by the electrodes 431 and 451 when a voltage is applied is identical irrespective of the polarization of the voltage source, as can be seen from FIG. 13c and FIG. 13f. If the width of the electrodes 431 and 451 for example differs furthermore, a different grayscale or a different color value results in the background area, for example a green or orange, depending on the voltage polarity. Furthermore, it is also possible to mold the partial electrodes 431 and 451 for example like the partial electrodes 431 and 421 according to FIG. 8a in the form of a grayscale image, with the result that a corresponding grayscale image, for example the grayscale image shown in FIG. 8b, results as background.

The electrodes 43 and 45 are arranged, as shown in FIG. 11a, underneath the electrodes 42 and 44, wherein the electrodes 43 and 45 are provided inside the area 22, contrary to the representation according to FIG. 11a.

As shown in FIG. 13d and FIG. 13g, depending on the polarity of the voltage a representation of the first motif on the one hand and a representation of the second motif on the other are shown when a voltage is applied between the electrodes 42 and 44. The effects generated on the one hand by the electrodes 43 and 45 and on the other hand by the electrodes 42 and 44 overlap, with the result that, depending on the polarity of the voltage applied to these electrodes, for example the different items of information shown in FIG. 13e and FIG. 13h are shown. As the electrodes 42 and 44 here are arranged closer to the display layer 122, the effect generated by these electrodes has priority action over the effects generated by the electrodes 43 and 45. For example, the first motif or the second motif or a corresponding inverted representation of a superimposition of the first and second motifs, depending on the alignment and voltage potential of the partial electrodes 431 and 451, are thus shown in front of a background determined by the shaping of the partial electrodes 431 and 451 depending on the polarity of the voltage applied to the electrodes 42 and 44.

Thus, for example, a flip between a white circle and a black square in front of a gray background and a black circle with a white square with a gray background appear when there is a change in the polarity.

Figure 14:
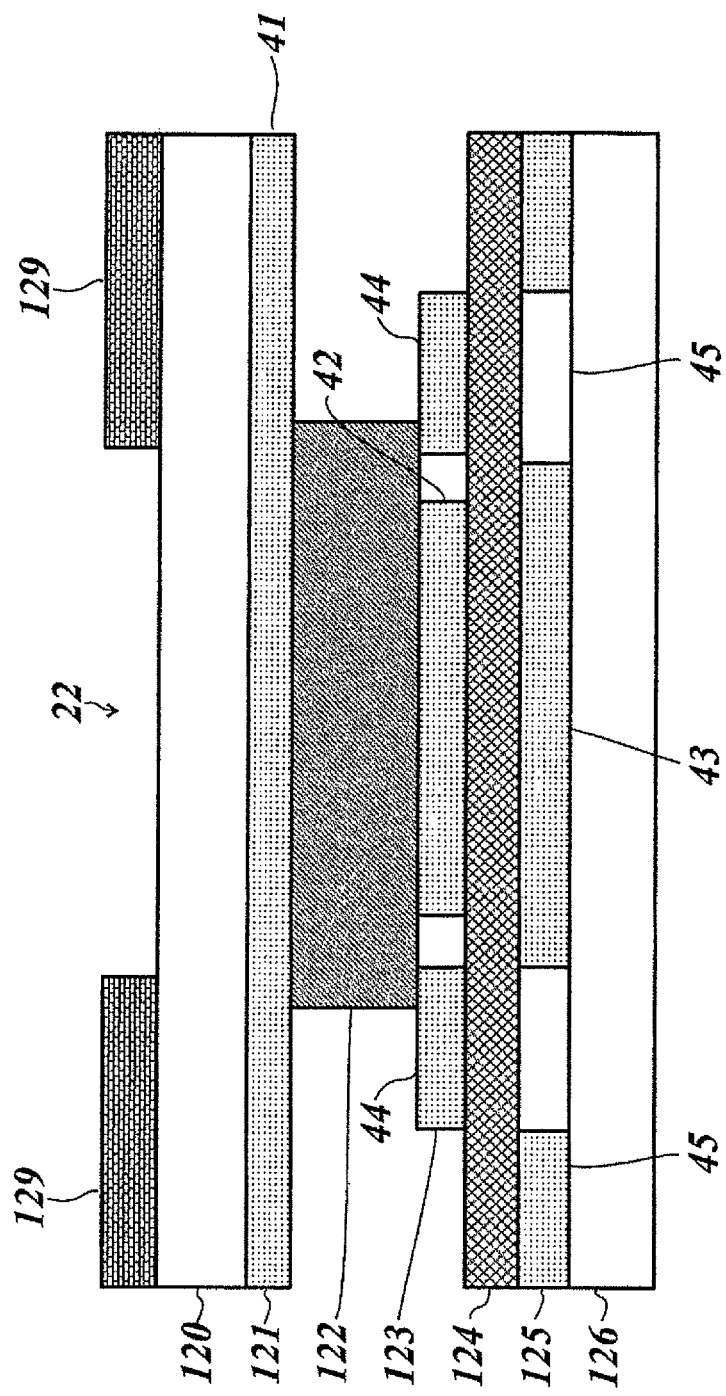
FIG. 14 shows a schematic sectional representation of a section of a display device.

With reference to FIG. 14, a further embodiment example is now described in which a motif in front of a single-color background is generated as optical information.

In this embodiment example, the display device has, in the area 22, the layer structure illustrated in FIG. 14 with the masking layer 129, the dielectric layer 120, the electrically conductive layer 121, the display layer 122, the electrically conductive layer 123 with the electrodes 42 and 44, the dielectric layer 124, the electrically conductive layer 125 with the electrodes 43 and 45 and the dielectric layer 126. The display device is thus constructed in the same way as according to FIG. 11a, except for the fact that the electrode 44 is arranged such that it does not display an optical effect in the area 22. In respect of the formation of the above-named layer, reference is thus made to the above statements regarding FIG. 11a and FIG. 1 to FIG. 4.

The electrode 42 is shaped in the form of a motif which can also be composed of different partial motifs. In respect of the shaping of the electrode 42, reference is thus made to the statements in this respect according to FIG. 11a. The electrode 44 overlaps the electrode 41 in an area which is covered by the masking layer 129 or in an area in which the display layer 122 is not provided or no display material is provided in the display layer 122. The electrode 43 is shaped in the area of the background of the motif, as indicated in FIG. 14. Here, it is also possible, as already stated regarding FIG. 11a, that the electrode 43 is structured in the area in which it overlaps the electrode 42, as shown for example in FIG. 3. The electrode 45 likewise overlaps the electrode 41 at least in areas either in an area which is optically covered by the masking layer 129 and/or in which the display layer 122 is not provided or no display material is provided in the display layer 122.

The contacting of the electrodes 42, 43, 44 and 45 with the power source 33 preferably takes place according to the interconnection according to FIG. 11b.

If the polarity of the power source 33 is changed, the electrode 42 is switched between positive and negative potential. The motif, for example the previously shown star or a letter "A", is thereby switched for example between white and black. The electrode 44 likewise changes its polarity, but in the opposite direction. Opposite charge carriers are thereby also induced in the electrode 41 (=charge equalization). If the polarity of the electrode 43 here is maintained, for example by controlling it by means of a diode as shown in FIG. 11b, the background area is located in the same switch state (e.g. positive, white background). The charge equalization here is realized by means of the electrode 45, which has an opposite polarity to the electrode 43. By changing the polarity of the power source applied to the electrodes 42 and 44, the motif here can thus be switched to visible (for example black motif in front of white background) or invisible (for example white motif in front of white background).

In addition, the color of the background can be correspondingly switched by correspondingly changing the polarity of the voltage applied to the electrodes 43 and 45 and—if the polarity of the voltage applied to the electrodes 42 and 44 is maintained—an inverted representation of the motif can likewise be made visible or invisible if the polarity is changed.

The invention claimed is:

1. A display device in the form of a multi-layer film body, wherein the display device has, in a first area, a first electrode, a second electrode, a third electrode and a display layer with a display material, wherein the display layer is arranged between the first electrode and the second electrode, and the third electrode is arranged on the side of the display layer facing away from the first electrode, wherein the first electrode is not galvanically connected to an electric potential and, when viewed perpendicular to the plane spanned by the display layer, the first electrode at least partially overlaps both the second electrode and the third electrode, and, when viewed in a direction perpendicular to the plane spanned by the display layer, the second electrode has a shape of a motif arranged in a motif area and, when viewed in a direction perpendicular to the plane spanned by the display layer, the third electrode has a shape corresponding to the shape of the motif in a background area, with the result that, when there is a voltage polarity applied to the second and third electrodes, the display material of the display layer in the motif area shows a first optical property and the display material of the display layer in the background area shows a second optical property contrasting the first optical property, whereby a representation of the motif is visually displayed by the display layer, and upon a change in polarity of the voltage applied to the second and third electrodes, the display material of the display layer in the motif area shows the second optical property and the display material of the display layer in the background area shows the first optical property, whereby an inverted representation of the motif results, in which the color of the motif area and the color of the background area are swapped with each other.

2. A display device according to claim 1, wherein the first electrode is encapsulated by dielectric layers.

3. A display device according to claim 1, wherein the first, second and/or third electrodes are formed transparent.

4. A display device according to claim 1, wherein the first electrode completely overlaps a whole surface area of the second and the third electrode.

5. A display device according to claim 1, wherein the display device has a power source and/or an electrical control circuit and the second and third electrodes, but not the first electrode, are galvanically connected to the power source or control circuit via a connection element.

6. A display device according to claim 5, wherein the power source is a piezo element, a solar cell, a battery and/or an antenna.

7. A display device according to claim 1, wherein the display material is formed such that, when a voltage is applied between the second and the third electrode, it shows different colors, in the overlap area of the first and second electrodes and in the overlap area of the first and the third electrode.

8. A display device according to claim 1, wherein the display material has a plurality of electrically charged particles which are dispersed in a liquid, wherein the liquid and the particles differ in terms of their color.

9. A display device according to claim 1, wherein the display material has a plurality of first particles and a plurality of second particles, wherein the first particles differ from the second particles in relation to their electric charge and in relation to their optical properties, wherein the first particles are positively charged and the second particles are negatively charged.

10. A display device according to claim 9, wherein the first particles and the second particles show different optical properties when viewed under incident light, which is reflected or scattered back to the observer.

11. A display device according to claim 1, wherein at least one of the second and third electrodes comprise a plurality of partial electrodes, the partial electrodes being connected by strip conductors, wherein the strip conductors have a width of less than 100 µm.

12. A display device according to claim 1, wherein the second and third electrodes are shaped and arranged such that when there is a change in polarity of the voltage applied to the second and third electrodes, the illusion of a movement of an object is shown as an optical effect.

13. A display device according to claim 12, wherein the second and third electrodes comprise a plurality of partial electrodes arranged together in a shape of a rotationally symmetrical object, wherein the partial electrodes of the second electrode and the partial electrodes of the third electrode are arranged alternating.

14. A display device according to claim 1, wherein the second electrode has several partial electrodes galvanically connected to each other, wherein the partial electrodes are arranged in at least one direction with a spacing of less than 300 µm, wherein each of the partial electrodes have a punctiform or linear shape.

15. A display device according to claim 14, wherein the width of the partial electrodes or the spacing between the partial electrodes are varied to generate a grayscale image.

16. A display device according to claim 14, wherein the third electrode is shaped over a whole surface or in an inverted pattern relative to the second electrode.

17. A display device according to claim 14, wherein the grid is a geometrically transformed grid and the partial electrodes have the shape of a wavy line.

18. A display device according to claim 14, wherein the partial electrodes are connected to each other by means of a plurality of strip conductors, which are arranged according to a regular or irregular grid.

19. A display device according to claim 1, wherein the second and third electrodes are arranged in one plane, and are formed by separate areas of a common electrically conductive layer.

20. A display device according to claim 1, wherein the second and the third electrode differ in terms of their spacing from the first electrode and are formed by areas of different electrically conductive layers which are spaced apart from each other in relation to the normal relative to the plane spanned by the first electrode.

21. A display device according to claim 20, wherein a dielectric layer is arranged between the second and the third electrode.

22. A display device according to claim 20, wherein the second electrode is arranged between the first electrode and the third electrode and the second electrode and the third electrode overlap in relation to the plane spanned by the display layer at least in areas, and overlap by less than 50%.

23. A display device according to claim 20, wherein the second electrode is arranged between the first electrode and the third electrode and the third electrode completely overlaps the second electrode in relation to the plane spanned by the display layer.

24. A display device according to claim 20, wherein the distance between the first and second electrodes, the distance between the first and third electrodes and the distance between the second and third electrodes are chosen such that c23 is smaller than $1/(1/c12+1/c13)$, wherein c12 is the capacitance between the first and second electrodes, c13 is the capacitance between the first and third electrodes and c23 is the capacitance between the second and third electrodes.

25. A display device according to claim 20, wherein the third electrode has depression areas and elevation areas, the depression areas completely overlapping the second electrode in relation to the plane spanned by the display layer, and wherein the elevation areas do not overlap the second electrode in relation to the plane spanned by the display layer, and wherein the distance between the first electrode and the depression areas of the third electrode is greater than the distance between the first electrode and the elevation areas of the third electrode.

26. A display device according to claim 25, wherein d1 is approximately d2 and d3 is greater than d2, wherein d1 is the distance between the first electrode and the second electrode, d2 is the distance between the first electrode and the elevation areas of the third electrode and d3 is the distance between the first electrode and the depression areas of the third electrode.

27. A display device according to claim 1, wherein the display device has a fourth electrode, wherein the second and fourth electrodes are arranged between the first and the third electrode and the first and fourth electrodes overlap at least in areas when viewed perpendicular to a plane spanned by the display layer.

28. A display device according to claim 27, wherein the fourth electrode is completely overlapped by the first electrode, and, wherein the second electrode forms a first item of information and the fourth electrode forms a second item of information.

29. A display device according to claim 27, wherein a fifth electrode is provided and the first and fifth electrodes overlap at least in areas when viewed perpendicular to a plane spanned by the display layer.

30. A display device according to claim 27, wherein the third electrode has areas not covered by the second and the fourth electrode.

31. A display device according to claim 27, wherein the second electrode has a plurality of first partial electrodes, galvanically connected to each other, which are shaped and arranged such that they form a first item of information, wherein the fourth electrode has a plurality of second partial electrodes, galvanically connected to each other, which are shaped and arranged such that they form a second item of information wherein the first and second partial electrodes have in each case a width of less than 300 μm and wherein the first and second partial electrodes are arranged gridded in each other, and are arranged alternating.

32. A display device according to claim 31, wherein the first and second partial electrodes have in each case a linear shape and wherein the first and second partial electrodes are arranged according to a one-dimensional grid with a grid width of less than 750 μm.

33. A display device according to claim 27, wherein, inside the first area, a fifth electrode is provided which is arranged on the side of the display layer facing away from the first electrode wherein the third electrode has a plurality of third partial electrodes galvanically connected to each other, wherein the fifth electrode has a plurality of fourth partial electrodes galvanically connected to each other, wherein the third and fourth partial electrodes have in each case a width of less than 300 μm, and wherein the third and fourth partial electrodes are arranged gridded in each other, and are arranged alternating.

34. A display device according to claim 27, wherein the display device has a rectifier, wherein one of the two outputs of the rectifier is connected to the third electrode and the other of the outputs of the rectifier is connected to the fifth electrode, and wherein the display device has a power source, wherein one of the outputs of the power source is connected to one of the inputs of the rectifier and to the second electrode, and the other of the outputs of the power source is connected to the other of the inputs of the rectifier and to the fourth electrode, wherein the power source is a piezo element.

35. A display device according to claim 27, wherein the fourth electrode is arranged outside the first area.

36. A display device according to claim 1, wherein the display device further comprises an optical security element selected from the group consisting of: a diffractive security element; a security element containing a thin-film layer system which generates a color shift effect dependent on the angle of view; a security element containing optically variable pigments; a security element containing microlenses; a security element containing liquid crystals.

37. A display device according to claim 36, wherein the optical security element at least partially overlaps the first area.

38. A display device according to claim 1, wherein the display device is a laminating film or transfer film.

* * * * *